United States Patent
Ichikawa et al.

(10) Patent No.: US 7,433,136 B2
(45) Date of Patent: Oct. 7, 2008

(54) LENS UNIT AND IMAGING DEVICE

(75) Inventors: Mitsuru Ichikawa, Saitama (JP); Takatoshi Uneme, Tokyo (JP); Atsushi Okita, Aichi (JP); Fujio Kanai, Kanagawa (JP)

(73) Assignee: Sony Corporation (JP)

( * ) Notice: Subject to any disclaimer, the term of this patent is extended or adjusted under 35 U.S.C. 154(b) by 158 days.

(21) Appl. No.: 11/581,739

(22) Filed: Oct. 16, 2006

(65) Prior Publication Data
US 2007/0097527 A1    May 3, 2007

(30) Foreign Application Priority Data
Oct. 17, 2005    (JP)    ............................ P2005-301977

(51) Int. Cl.
*G02B 7/02* (2006.01)
(52) U.S. Cl. ....................................... 359/811; 359/819
(58) Field of Classification Search .......... 359/811–823
See application file for complete search history.

(56) References Cited

U.S. PATENT DOCUMENTS 4,662,717 A * 5/1987 Yamada et al. .............. 359/362
5,612,826 A * 3/1997 Ohshita ...................... 359/819

* cited by examiner

*Primary Examiner*—Mohammed Hasan
(74) *Attorney, Agent, or Firm*—Lerner, David, Littenberg, Krumholz & Mentlik, LLP

(57) ABSTRACT

A lens unit includes a lens barrel having an imaging optical system arranged therein and a movable unit having a movable lens, the movable unit being movable in an optical axis direction with respect to the lens barrel. The lens barrel includes a first member and a second member adapted to be coupled together in a coupling direction. Fixing pieces are provided on the first member and the second member, respectively, and fixing means is filled between the fixing pieces when the first member and the second member are coupled together. The respective fixing pieces are provided in positions at which a force is applied in a direction in which the fixing means is compressed by the respective fixing pieces when a force is applied to the first member and the second member in a direction in which the first member is released from the second member.

5 Claims, 40 Drawing Sheets

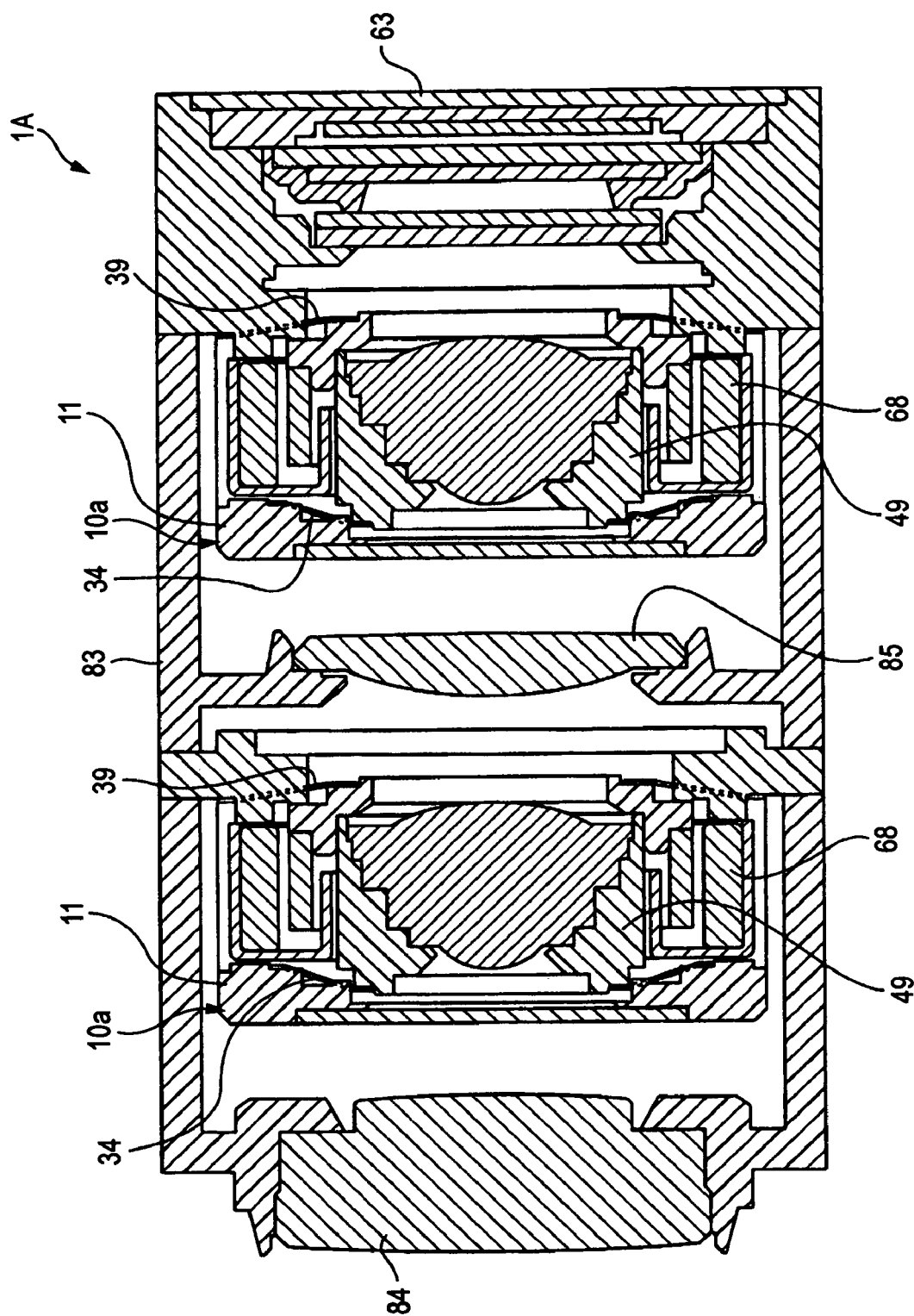

LENS UNIT AND IMAGING DEVICE

CROSS-REFERENCE TO RELATED APPLICATIONS

This application claims priority from Japanese Patent Application No. JP 2005-301977 filed on Oct. 17, 2005, the disclosure of which is hereby incorporated by reference herein.

BACKGROUND OF THE INVENTION

1. Field of the Invention

The present invention relates to a technical field concerning a lens unit and an imaging device. More particularly, the present invention relates to a technical field for providing fixing pieces, which are in a predetermined positional relation, in a first member and a second member constituting a lens barrel, respectively, to realize improvement of coupling strength of the first member and the second member.

2. Description of the Related Art

A lens unit having an imaging optical system such as a movable lens arranged in a lens barrel is built in various imaging devices such as a video camera, a still camera, and a cellular phone. In some lens units, the imaging optical system such as the movable lens is arranged inside the lens barrel (see, for example, JP-A-5-264878 and JP-A-8-15593).

In such lens units, the lens barrel has a first member and a second member. For example, the first member and the second member are coupled by bonding in an optical axis direction of the movable lens.

However, in the imaging device in the past, since surfaces on opposed sides of the first member and the second member are coupled by bonding, if the respective bonded surfaces peel away from an adhesive when, for example, the imaging device is dropped and a strong impact occurs, a coupling state of the first member and the second member becomes unstable. It is likely that, in the worst case, the first member and the second member are separated.

Thus, it is desirable to overcome the problem and realize improvement of coupling strength of the first member and the second member.

SUMMARY OF THE INVENTION

According to an embodiment of the invention, a lens unit and an imaging device include a lens barrel having an imaging optical system arranged therein and a movable unit having a movable lens, the movable unit being movable in an optical axis direction with respect to the lens barrel. The lens barrel includes a first member and a second member adapted to be coupled together in a coupling direction. Fixing pieces are provided on the first member and the second member, the fixing pieces being spaced apart from one anther in the coupling direction when the first member and the second member are coupled together. Fixing means is filled between the fixing pieces when the first member and the second member are coupled together. The respective fixing pieces are provided in positions at which a force is applied in a direction in which the fixing means is compressed by the respective fixing pieces when a force is applied to the first member and the second member in a direction in which the first member is released from the second member.

Therefore, in the lens unit and the imaging device according to the embodiment of the invention, when a force is applied to the first member and the second member in the direction in which the coupling is released, a force is applied to the fixing pieces in the direction in which the respective fixing pieces move closer to each other.

BRIEF DESCRIPTION OF THE DRAWINGS

In the accompanying drawings:

FIG. 40 is an enlarged sectional view showing an example of an imaging device in which two lens units are arranged.

DETAILED DESCRIPTION

Embodiments of the invention will be hereinafter explained in detail with reference to the accompanying drawings. It is possible to apply the invention to various imaging devices having a function for moving image photographing or still image photographing such as a cellular phone, a video camera, and a still camera.

Figure 1:
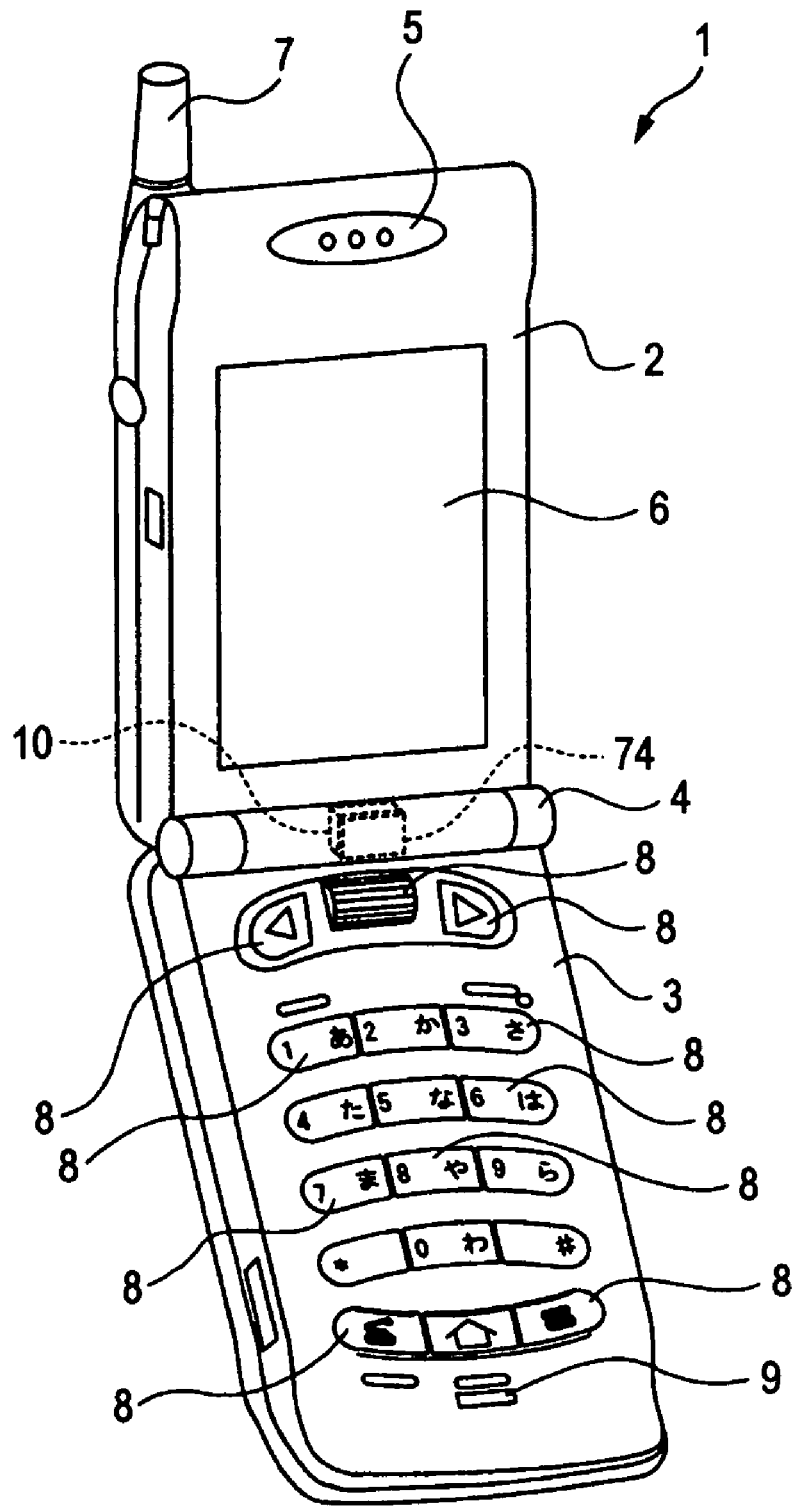
FIG. 1 is a perspective view showing, in conjunction with FIGS. 2 to 40, an embodiment of the invention, and showing a cellular phone as an example of an imaging device.

As an imaging device 1, for example, there is a cellular phone shown in FIG. 1. In the imaging device 1, a first housing 2 and a second housing 3 are coupled to be foldable via a hinge unit 4.

A speaker 5, a display unit 6, and an antenna 7 are provided in a first housing 2. The antenna 7 is stretchable.

Various operation units 8 including push buttons and a rotary dial and a microphone 9 are provided in a second housing 3.

An imaging unit 10 and a shutter unit described later are built in the hinge unit 4. A predetermined push button among the operation units 8 functions as the operation unit 8 for photographing images. When this operation unit 8 is pressed, the imaging unit 10 and the shutter unit are operated to make it possible to photograph images.

The imaging device 1 also has a function of reading information of various kinds of display for identification such as a one-dimensional barcode and a two-dimensional barcode 1000 and 2000 (see FIG. 2) and identifying the information. When these barcodes are photographed by the imaging unit 10, code patterns of the barcodes are recognized and information based on the code patterns recognized is read.

An example of a structure of the imaging unit 10 will be explained. In the following explanation, for convenience of explanation, an optical axis direction (S shown in FIG. 3) is set as a front to rear direction and a subject side is set as a front.

In the imaging unit 10, necessary units are arranged in a lens barrel 11. The imaging unit 10 includes a lens unit 10a and an imaging unit having an imaging element described later. A first member 12 and a second member 13 are coupled in front of and behind the lens barrel 11 to constitute the lens barrel 11 (see FIGS. 3 to 6). The first member 12 and the second member 13 are formed of, for example, a resin material such as polycarbonate.

Figure 7:
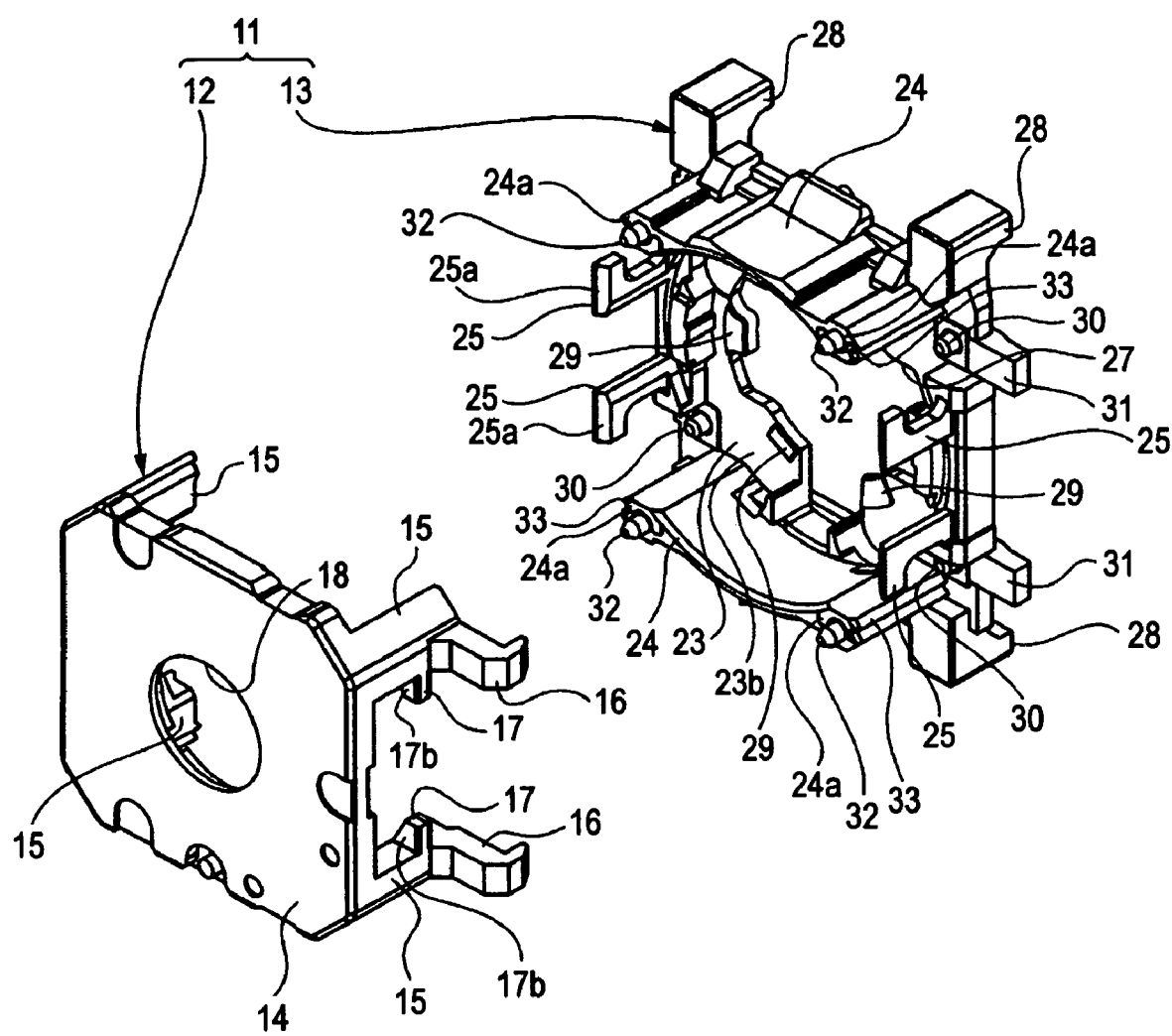
FIG. 7 is an enlarged disassembled perspective view of a lens barrel.
Figure 8:
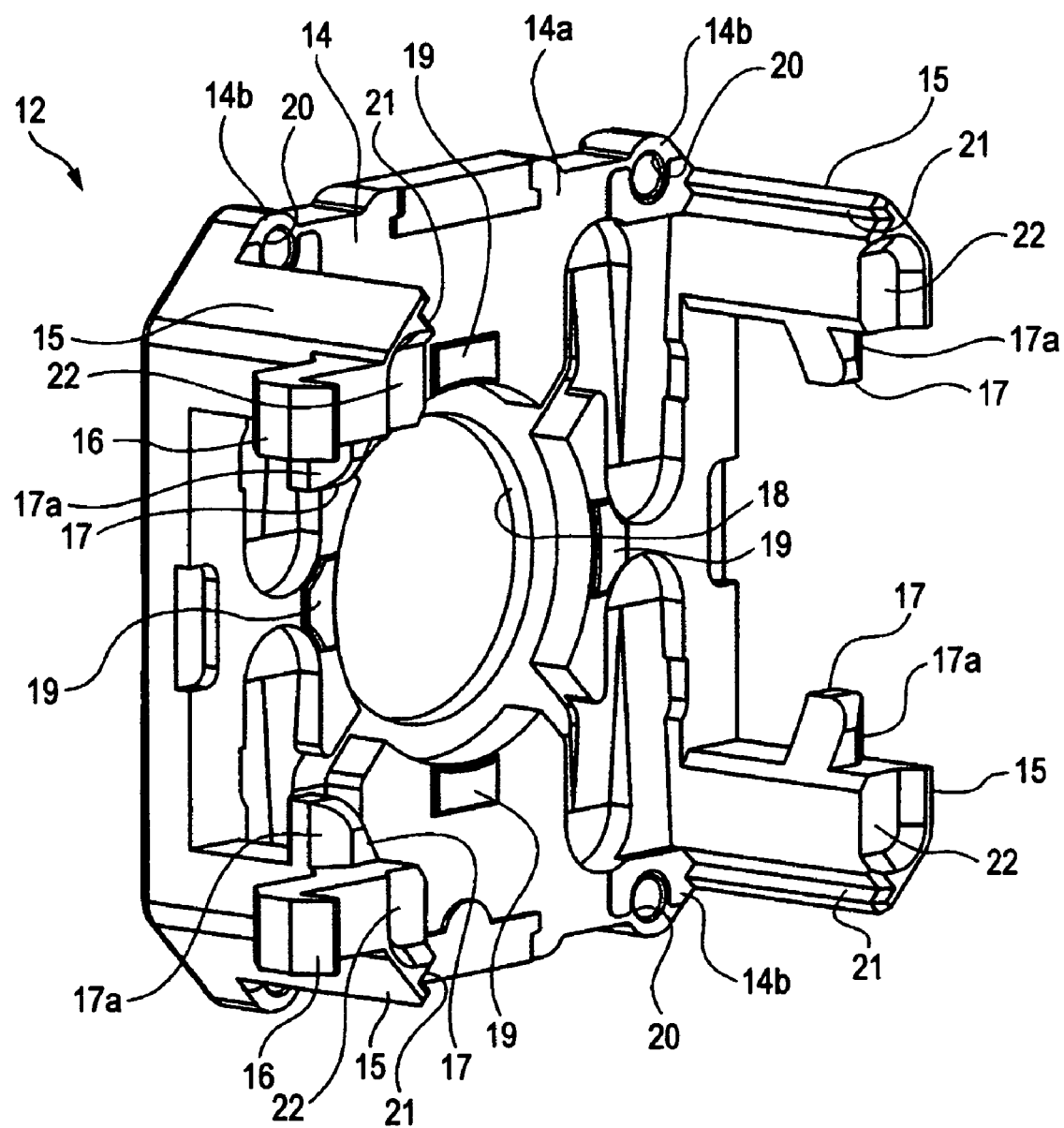
FIG. 8 is an enlarged perspective view showing a first member of the lens barrel in a state in which the first member is viewed from a direction different from a direction in FIG. 7.

In the first member 12, as shown in FIGS. 7 and 8, a base surface section 14 that faces the front to rear direction and is formed in a substantially rectangular shape, projections 15 projected backward from positions at four corners of the base surface section 14, respectively, spring bent sections 16 projected outward (sideward) from the two projections 15, respectively, and fixing pieces 17 projected upward or downward to come close to one another from positions closer to rear ends of the projections 15 are integrally formed.

A through hole 18 pierced through the base surface section 14 is formed in the center thereof.

On a rear surface 14a of the base surface section 14, regulating surface sections 19 slightly projected backward are provided in positions around the through hole 18 (see FIG. 8). When a movable unit described later is moved forward, the movable unit can come into contact with the regulating surface sections 19. The regulating surface sections 19 have a function of regulating forward movement of the movable unit. A position where the movable unit comes into contact with the regulating surface sections 19 is set as a macro end in focus driving.

Positioning holes 20 are formed in positions at four corners of the rear surface 14a of the base surface section 14, respectively.

In the imaging device 1, as described later, the movable unit is moved from an infinite side to a macro end side according to the driving of a linear actuator by electric current application to a driving coil. By controlling an amount of electric current application, it is possible to move the movable unit to a position just before the position where the movable unit comes into contact with the regulating surface sections 19. This position may be set as a macro end that is a moving end on the front side of the movable unit.

Guide grooves 21 that extend forward and backward are formed in the projections 15 of the first member 12, respectively.

Clearance recesses 22 are formed in rear end surfaces of the projections 15, respectively.

Sections around the positioning holes 20 of the rear surface 14a of the base surface section 14 are formed as four spring nip surfaces 14b, respectively (see FIG. 8).

Inclined planes 17a, which are displaced further inward in positions closer to the rear thereof, are formed on outer surfaces of the fixing pieces 17 of the first member 12, respectively (See FIG. 8). Opposed surfaces 17b facing forward are formed in the fixing pieces 17, respectively. Therefore, in the fixing pieces 17, the inclined planes 17a are formed on the rear side, respectively, and front end surfaces thereof are formed as the opposed surfaces 17b.

Figure 9:
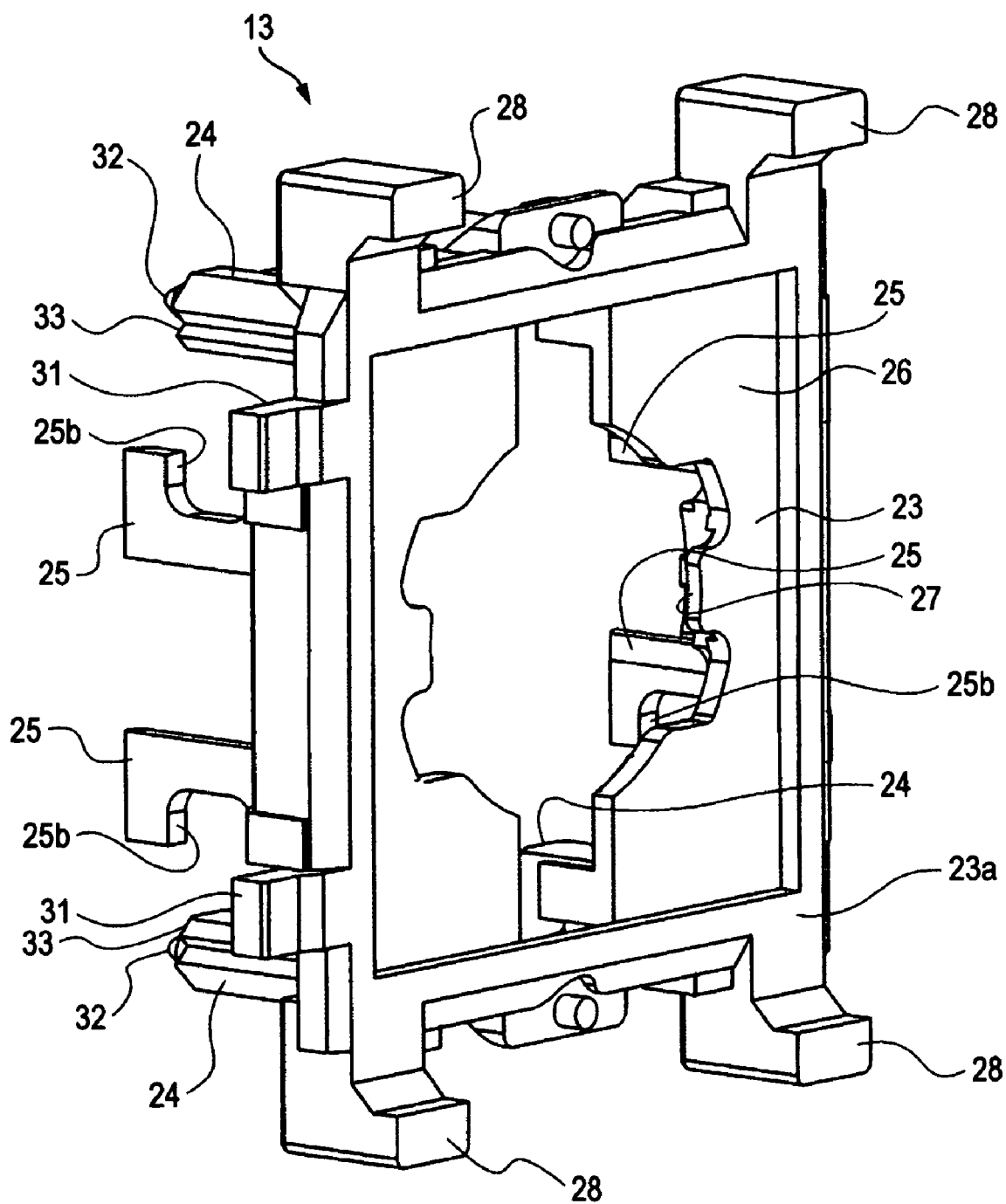
FIG. 9 is an enlarged perspective view showing a second member of the lens barrel in a state in which the second member is viewed from a direction in FIG. 7.

In the second member 13, as shown in FIGS. 7 and 9, a base surface section 23 facing in the front to rear direction, projections 24 projected forward from both upper and lower side edges of the base surface section 23, respectively, and fixing pieces 25 projected forward from both right and left side edges of the base surface section 23, respectively, are integrally formed. Two fixing pieces 25 are provided to be spaced apart vertically from each other at each of both the right and the left side edges of the base surface section 23.

A shallow arrangement recess 26 of a rectangular shape is formed in a rear surface 23a of the base surface section 23 (see FIG. 9). A light transmitting hole 27 pierced through the base surface section 23 is formed in the center thereof. In the rear surface 23a of the base surface section 23, positioning projections 28 projected backward are provided at four corners thereof, respectively.

Figure 10:
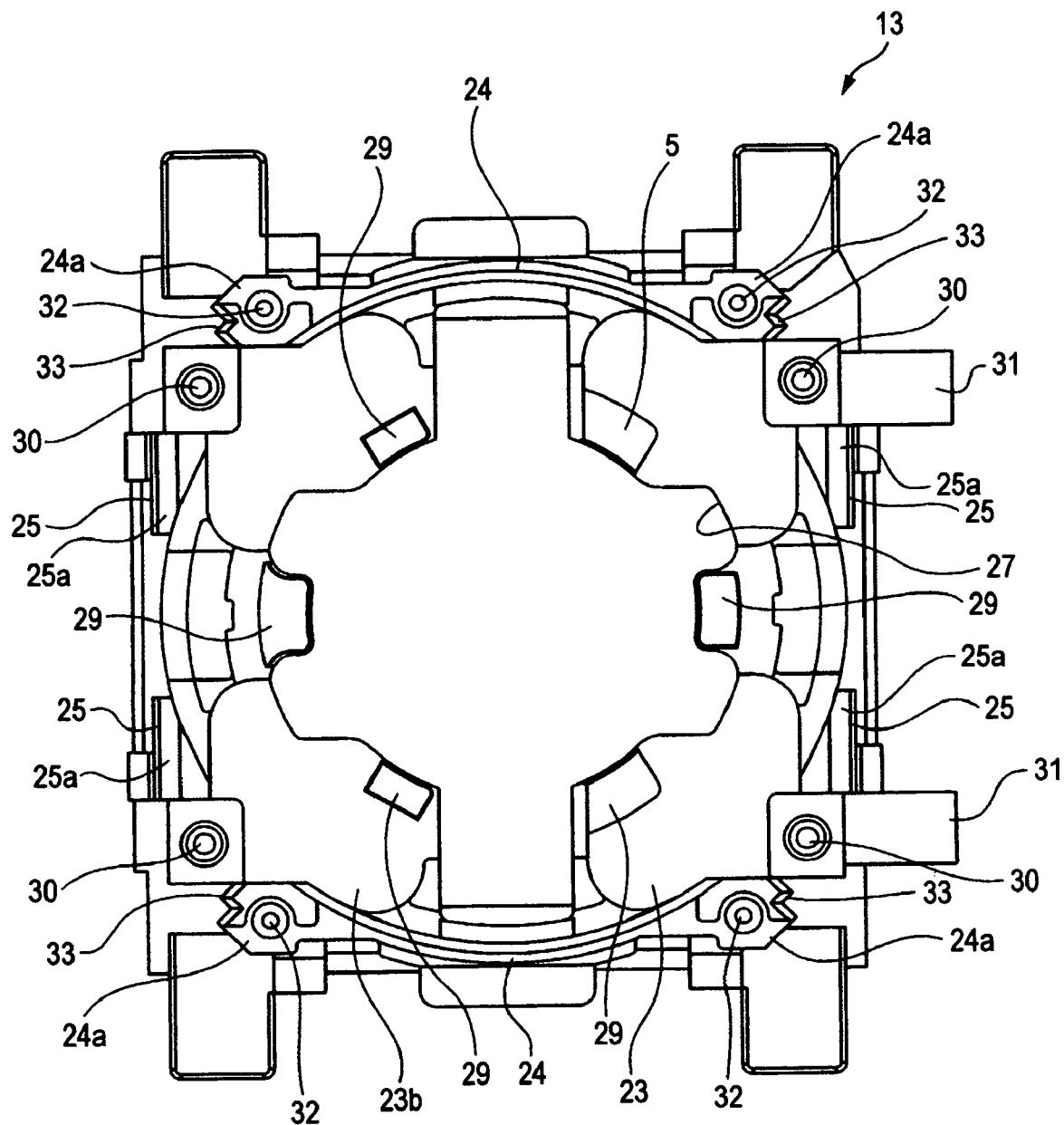
FIG. 10 is an enlarged front view of the second member of the lens barrel.

In a front surface 23b of the base surface section 23, for example, six regulating surface sections 29 are provided in positions around the light transmitting hole 27 (see FIGS. 7 and 10). The regulating surface sections 29 are provided to be slightly projected forward in positions at equal intervals in a peripheral direction around the light transmission hole 27.

When the movable unit is moved backward, the movable unit is brought into contact with the regulating surface sections 29. The regulating surface sections 29 have a function of regulating backward movement of the movable unit. A position where the movable unit is in contact with the regulating surface sections 29 is set as infinity in focus driving.

In the imaging device 1, as in the case of the macro end, it is possible to move the movable section to a position just before the position where the movable unit comes into contact with the regulating surface sections 29. This position may be set as infinity that is a moving end on the front side of the movable unit.

In the front surface 23b of the base surface section 23, caulking pins 30 are provided in positions at four corners thereof (see FIGS. 7 and 10).

Viewed from the front, spring bearings 31 projected sideward to be spaced apart vertically from each other are provided at the right end of the base surface section 23.

In tip surfaces of the projections 24 of the second member 13, positioning pins 32 are provided at both right and left ends thereof, respectively. Sections around the positioning pins 32 in the tip surfaces of the projections 24 are formed as spring nip surfaces 24a, respectively. Guide projections 33 that extend the front and the rear are provided at both right and left ends of the projections 24, respectively.

The fixing pieces 25 are formed in a laid L shape. Inclined planes 25a, which are displaced further outward in positions closer to the front thereof, are formed on outer surfaces of the top ends thereof. Opposed surfaces 25b facing backward are formed in the fixing pieces 25, respectively. Therefore, in the fixing pieces 25, the inclined planes 25a are formed on the front side thereof, respectively, and rear end surfaces thereof are formed as the opposed surfaces 25b.

Figure 3:
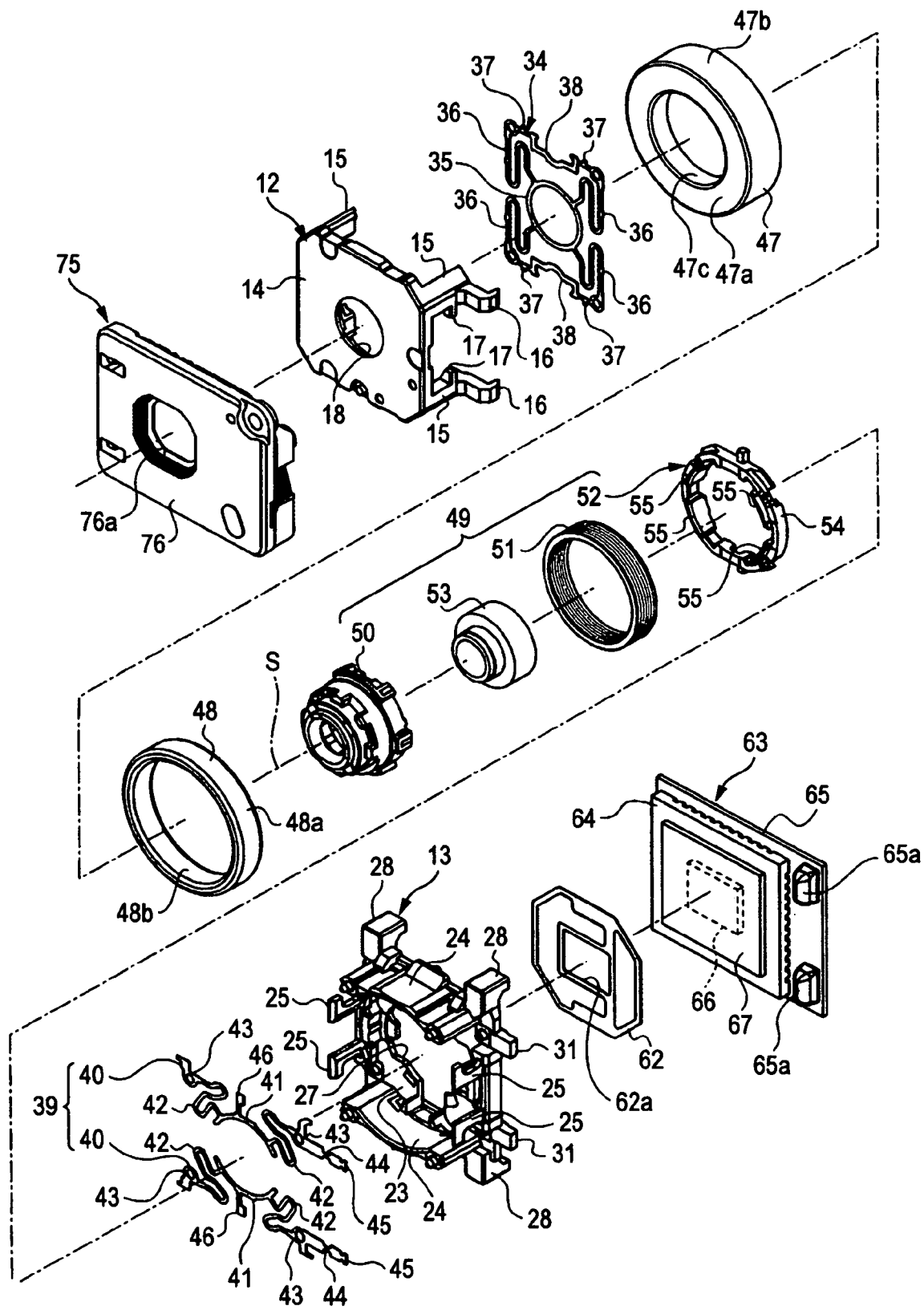
FIG. 3 is a disassembled perspective view showing an imaging unit and a shutter unit.
Figure 4:
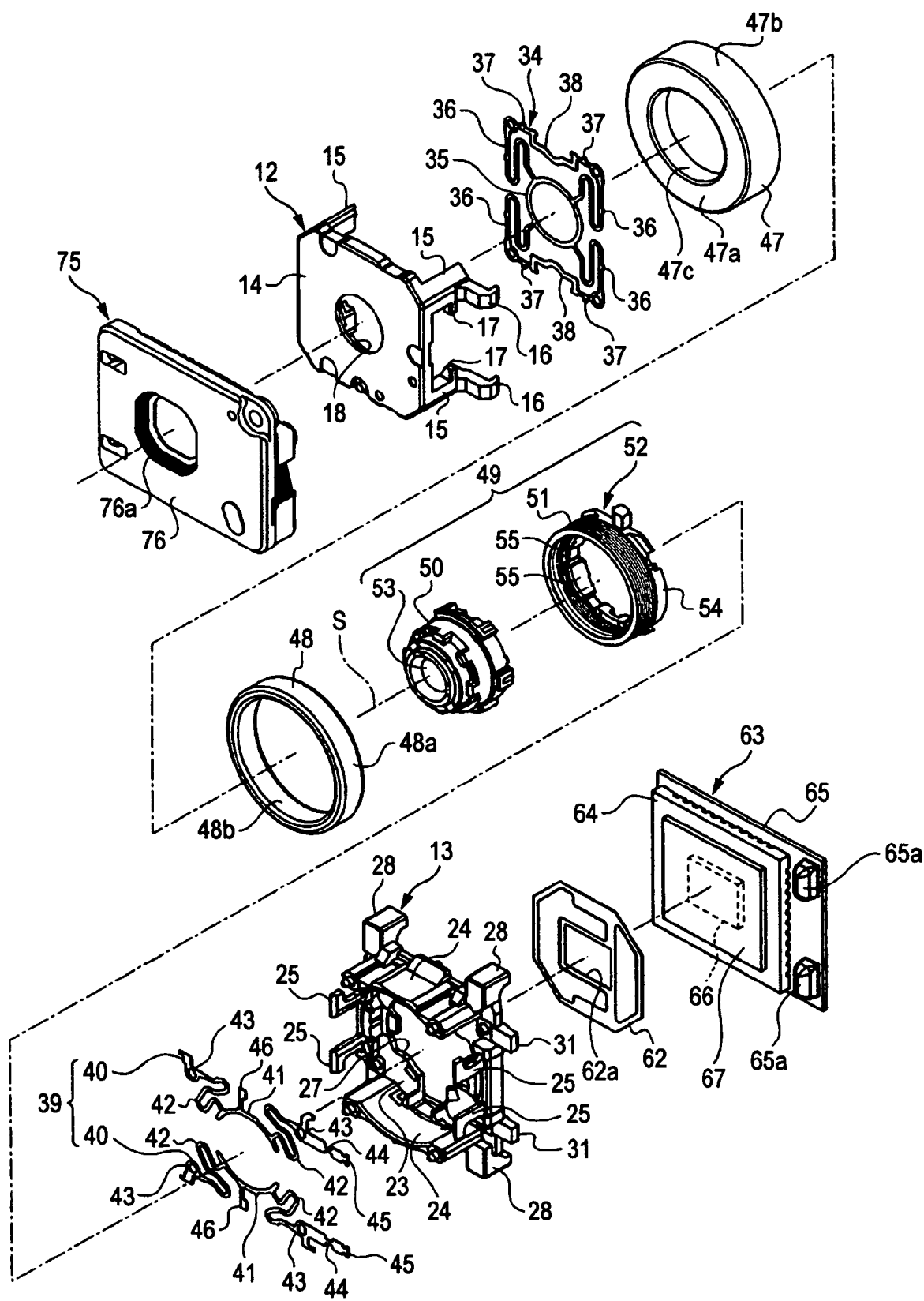
FIG. 4 is a disassembled perspective view showing the imaging unit and the shutter unit partially assembled.
Figure 5:
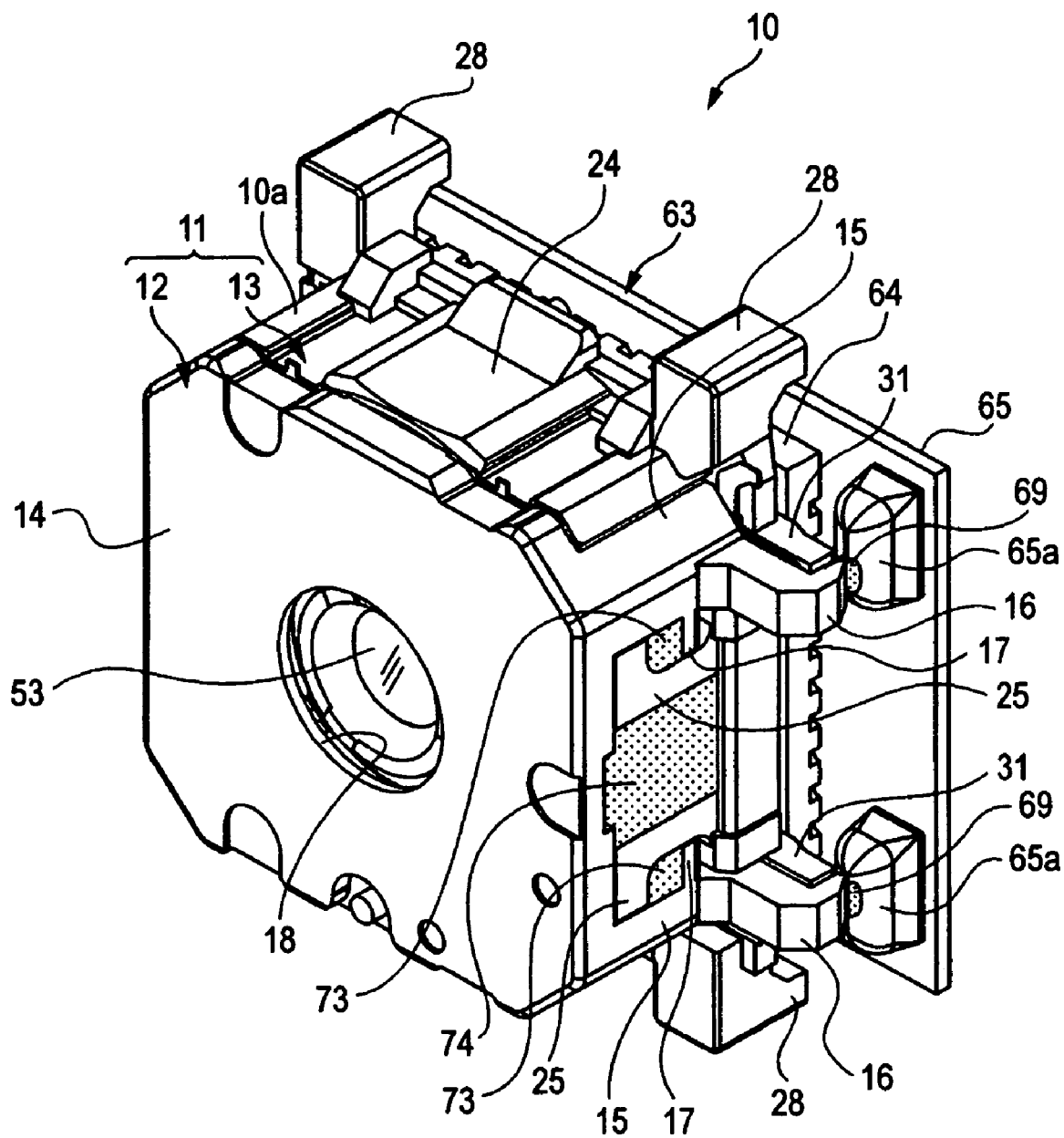
FIG. 5 is an enlarged perspective view of the imaging unit.

First urging leaf springs 34 are attached to the lens barrel 11 (see FIGS. 3 and 4).

Figure 11:
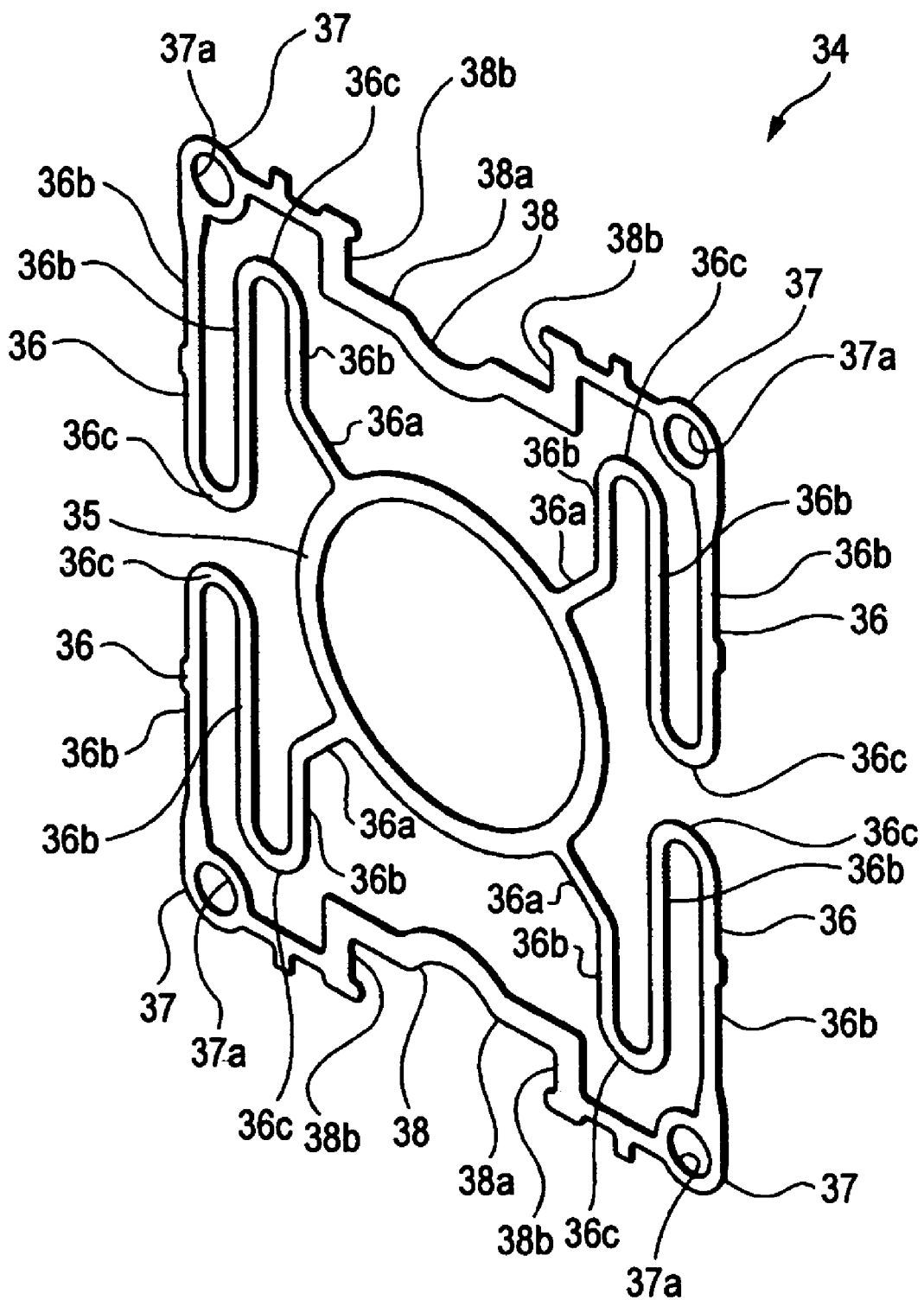
FIG. 11 is an enlarged perspective view of a first urging leaf spring.

The first urging leaf springs 34 are formed of a metal material abound in elasticity such as beryllium copper. A thickness direction of the first urging leaf spring 34 is set to coincide with the front to rear direction, that is, the optical axis direction. In the first urging leaf spring 34, as shown in FIG. 11, a holding section 35, four spring sections 36, four attachment sections 37, and coupling sections 38 are integrally formed.

The holding section 35 is formed in an annular shape.

The spring sections 36 are formed in a laid substantially S shape. One ends of the spring sections 36 are continued to position at equal intervals in a peripheral direction of the holding section 35. Each of the spring sections 36 includes an inclined section 36a projected short in a radial direction from the holding section 35, three parallel linear sections 36b that extend vertically, and bent sections 36c of a semi-arcuate shape that couple the linear sections 36b adjacent to each other. One end of the linear section 36b located on an innermost side is continued to the other end of the inclined section 36a.

The attachment sections 37 extend horizontally long. Outer ends thereof are continued to one ends of the linear sections 36b located on outermost side.

The coupling sections 38 includes horizontal sections 38a that extend horizontally and vertical sections 38b, one ends of which continue to both right and left ends of the horizontal sections 38a, respectively, and extend vertically short. The other ends of the vertical sections 38b are continued to the other ends on an inner side of the attachment sections 37, respectively. In the coupling sections 38, the horizontal sections 38a are located closer to the holding section 35 side than the attachment sections 37.

Attachment holes 37a are formed in the attachment sections 37, respectively.

In the first urging leaf spring 34, upper and lower positions of the spring sections 36 are line symmetry and right and left positions of the spring sections 36 are also line symmetry. Thus, the respective spring sections 36 are constituted to show an identical spring force.

In the first urging leaf spring 34, as the spring sections 36 are elastically deformed in a direction in which the spring sections 36 bend forward and backward, the holding section 35 is moved to the front to rear direction (the optical axis direction) with respect to the attachment sections 37. A force generated in a place orthogonal to the optical axis at this point is controlled by the linear sections 36b and the bent sections 36c. The holding section 35 is moved only in the optical axis direction.

The first urging leaf spring 34 is attached to the lens barrel 11 in a state in which the positioning pins 32 of the second member 13 are inserted into the attachment holes 37a, respectively, and the attachment sections 37 are nipped by the spring nip surfaces 14b of the first member 12 and the spring nip surface 24a of the second member 13, respectively. The positioning pins 32 are inserted into the positioning holes 20 of the first member 12, respectively, to position the first member 12 and the second member 13.

The second urging leaf spring 39 is attached to the lens barrel 11 (see FIGS. 3 and 4).

The second urging leaf spring 39 is formed of a metal material abound in elasticity such as beryllium copper. A thickness direction thereof is set to coincide with the front to rear direction, that is, the optical axis direction. The second urging leaf spring 39 is constituted by two spring members 40 formed in a shape line symmetrical in the vertical direction.

Figure 12:
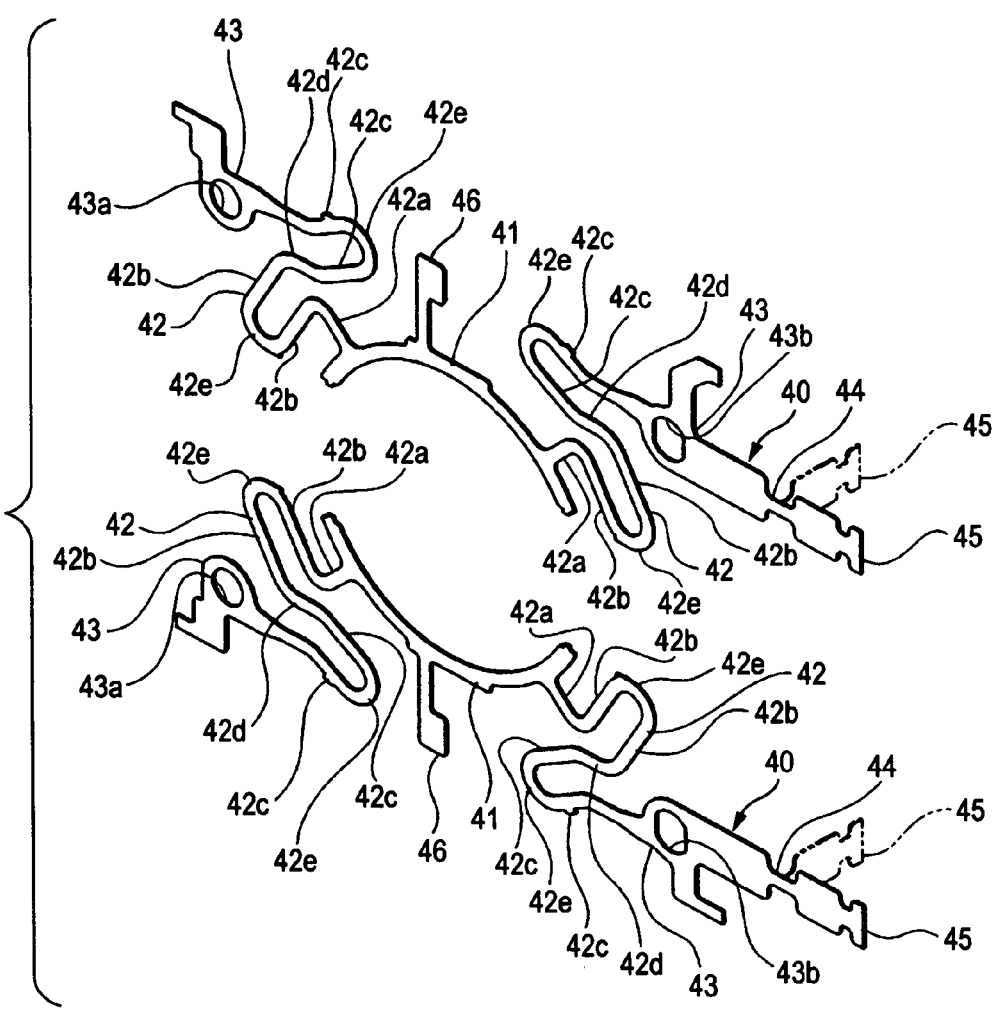
FIG. 12 is an enlarged perspective view of a second urging leaf spring.

In the spring member 40, as shown in FIG. 12, a holding section 41, two spring sections 42, two attachment sections 43, a fold section 44, a connection terminal section 45, and a coil connecting section 46 are integrally formed.

The holding section 41 is formed in a substantially arcuate shape.

The spring sections 42 are formed in a substantially S shape. One ends of the spring sections 42 are continued to sections spaced apart in a peripheral direction of the holding section 41. Each of the spring sections 42 includes an inclined section 42a projected short in a radial direction from the holding section 41, first linear sections 42b that extend in a substantial tangential direction of the holding section 41 and are parallel to each other, second linear sections 42c that extend in a substantially tangential direction of the holding section 41 and are parallel to each other, a connecting section 42d that couples one end of the first linear section 42b located on the outer side and one end of the second linear section 42c located on the inner side, and bent sections 42e of a semi-arcuate shape that couple the linear sections 42 adjacent to each other and couple the second linear sections 42c adjacent to each other. One end of the first linear section 42b located on the inner side is continued to the other end of the inclined section 42a.

One ends of the attachment sections 43 are continued to one ends of the second linear sections 42c located on the outer side, respectively. Positioning holes 43a and 43b are formed in the attachment sections 43, respectively. The positioning hole 43a is formed in a circular shape. The positioning hole 43b is formed vertically long.

The connection terminal section 45 is continued to one attachment section 43 via the fold section 44.

The attachment section 43, the fold section 44, and the connection terminal section 45 are formed horizontally long. A vertical width of the fold section 44 is set smaller than a vertical width of the attachment section 43 and the connection terminal section 45.

The coil connecting section 46 is projected in a radial direction from the center in the peripheral direction of the holding section 41 and provided in the center between respective continuous sections of the holding section 41 and the spring sections 42.

In the second urging leaf spring 39, upper and lower positions of the spring sections 42 are line symmetry and left and right positions of the sprint sections 42 are also line symmetry. Thus, the respective spring sections 42 are constituted to shown an identical spring force.

The second urging leaf spring 39 is arranged symmetrically in the vertical direction. Thus, at the time of movement in the optical axis direction of a movable unit described later having a movable lens, it is possible to urge the movable unit in the optical axis direction in a state in which a satisfactory balance is secured.

In the second urging leaf spring 39, as the spring sections 42 are elastically deformed in a direction in which the spring sections 42 bend forward, the holding sections 41 are moved forward (in the optical axis direction) with respect to the attachment section 43. However, a force generated in a plane orthogonal to the optical axis at this point is controlled by the first linear sections 42b, the second linear sections 42c, the connecting sections 42d, and the bent sections 42e. The holding sections 41 are moved only in the optical axis direction.

The thickness of the second urging leaf spring 39 is set smaller than the thickness of the first urging leaf spring 34. A spring force of the first urging leaf spring 34 is set larger than a spring force of the second urging leaf spring 39.

Figure 13:
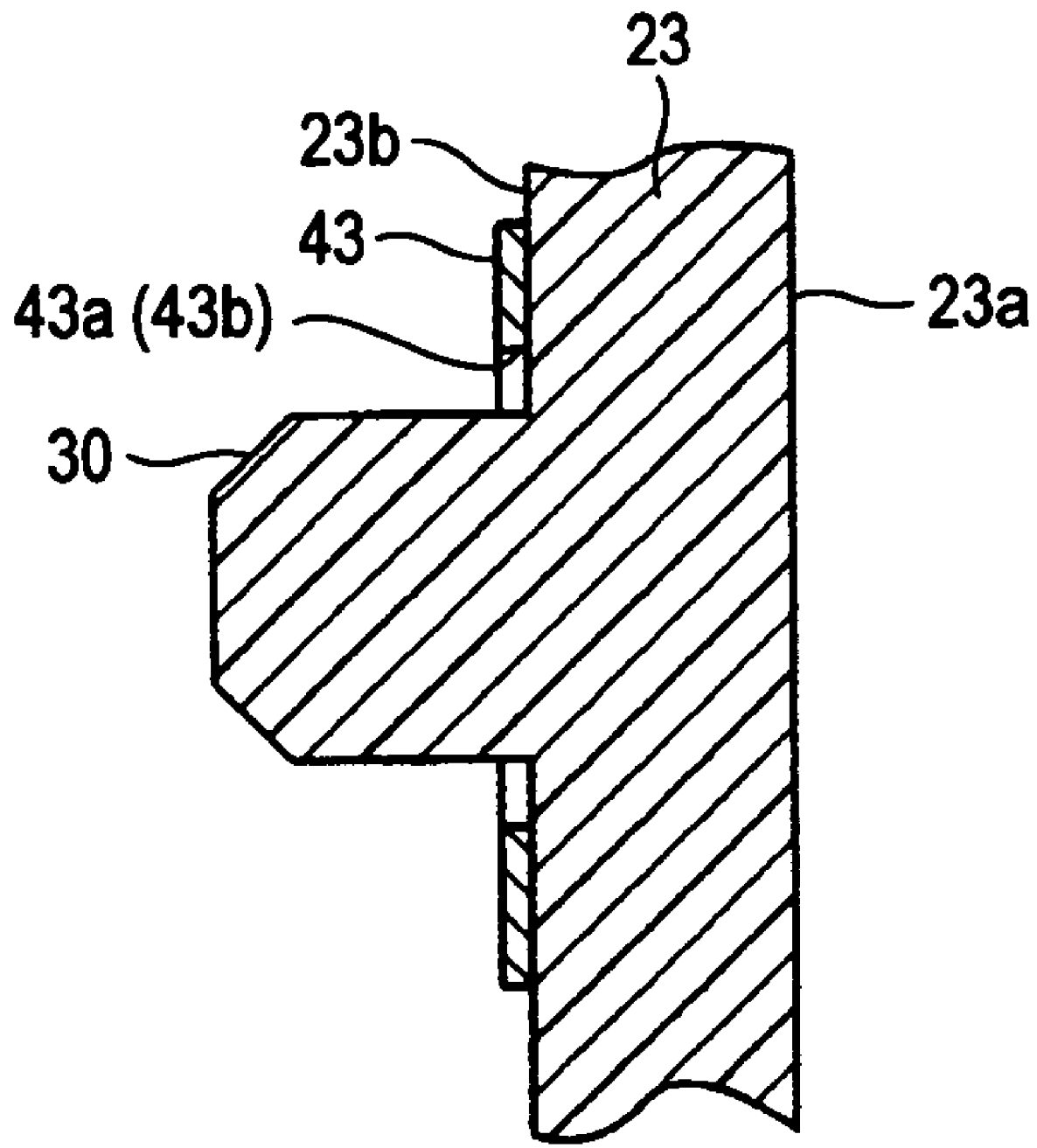
FIG. 13 is an enlarged sectional view showing a state before a caulking pin is caulked.
Figure 14:
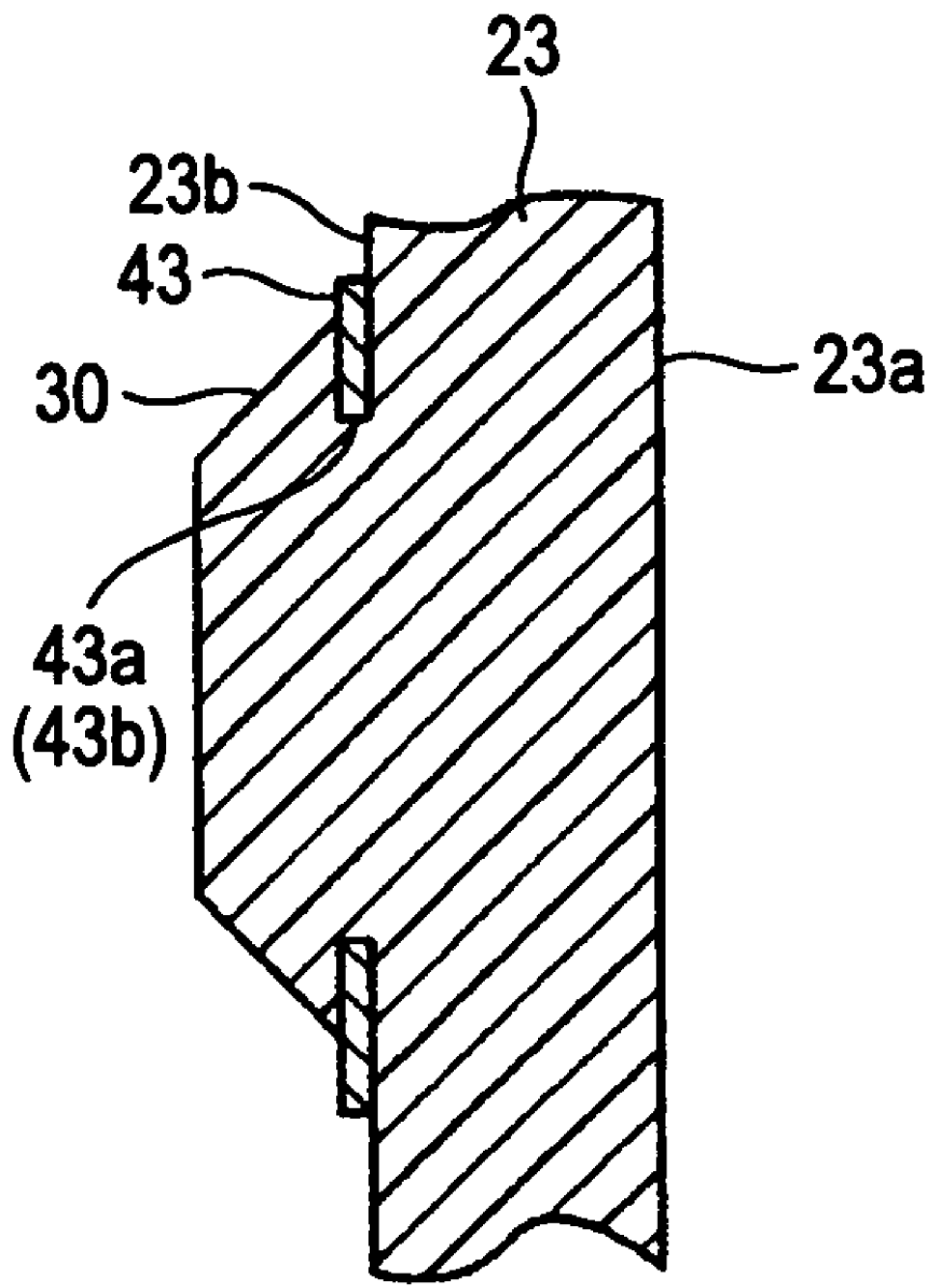
FIG. 14 is an enlarged sectional view showing a state in which the caulking pin is caulked and the second urging leaf spring is fixed to the second member.

In the second urging leaf spring 39, the caulking pins 30 of the second member 13 are inserted through the positioning holes 43a and 43b formed in the attachment sections 43, respectively (see FIG. 13). In a state in which the caulking pins 30 are inserted through the positioning holes 43a and 43b, respectively, thermal caulking or ultrasonic caulking is applied to the caulking pins 30 (see FIG. 14) to attach the second urging leaf spring 39 to the second member 13.

When caulking work for the caulking pins 30 is performed, in order to prevent the second urging leaf spring 39 from positionally deviating with respect to the second member 13 by a distance equivalent to a gap between the caulking pins 30 and the positioning holes 43b vertically long, the second urging leaf spring 39 and the second member 13 are positioned by a jig and held in a fixed state.

In the example described above, the caulking pins 30 are provided in the second member 13 to fix the second urging leaf spring 39 to the second member 13 by caulking. However, means for fixing the second urging leaf spring 39 to the second member 13 is not limited to caulking. For example, it is also possible to use other fixing means such as screwing and bonding.

Figure 6:
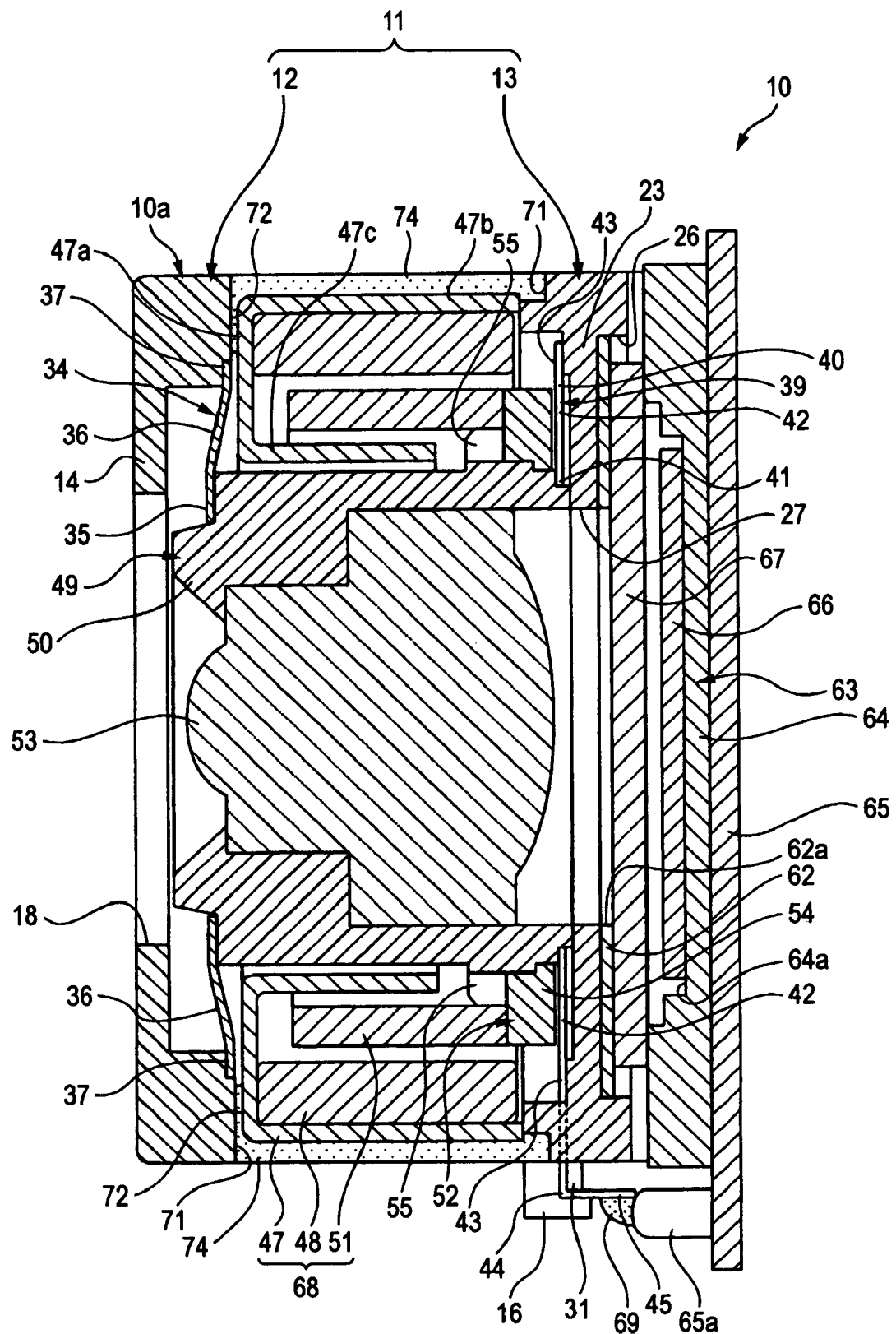
FIG. 6 is a schematic enlarged sectional view of the imaging unit.

A yoke 47 is arranged in the inside of the lens barrel 11 (see FIGS. 3, 4, and 6). The yoke 47 is formed of a magnetic metal material and includes a base 47a formed in an annular shape, an outer peripheral section 47b projected backward from an outer peripheral edge of the base 47a, and an inner peripheral section 47c projected backward from an inner peripheral edge of the base 47a.

A driving magnet 48 is arranged in the inside of the yoke 47. A half on an outer peripheral side and a half on an inner peripheral side of the driving magnet 48 are polarized as magnetic poles 48a and 48b different from each other. For example, the magnetic pole 48a on the outer peripheral side is set as an N pole and the magnetic pole 48b on the inner peripheral side is set as the S pole. The driving magnet 48 is attached to the yoke 47 in a state in which the driving magnet 48 is in contact with the base 47a and the outer peripheral section 47b (see FIG. 6).

A movable unit 49 is arranged in the inside of the lens barrel 11 in a state in which the movable unit 49 is movable in the optical axis direction. The movable unit 49 includes a lens holder 50, a driving coil 51, a coil holder 52, and a lens block 53 held by the lens holder 50 (see FIGS. 3 and 4).

Figure 15:
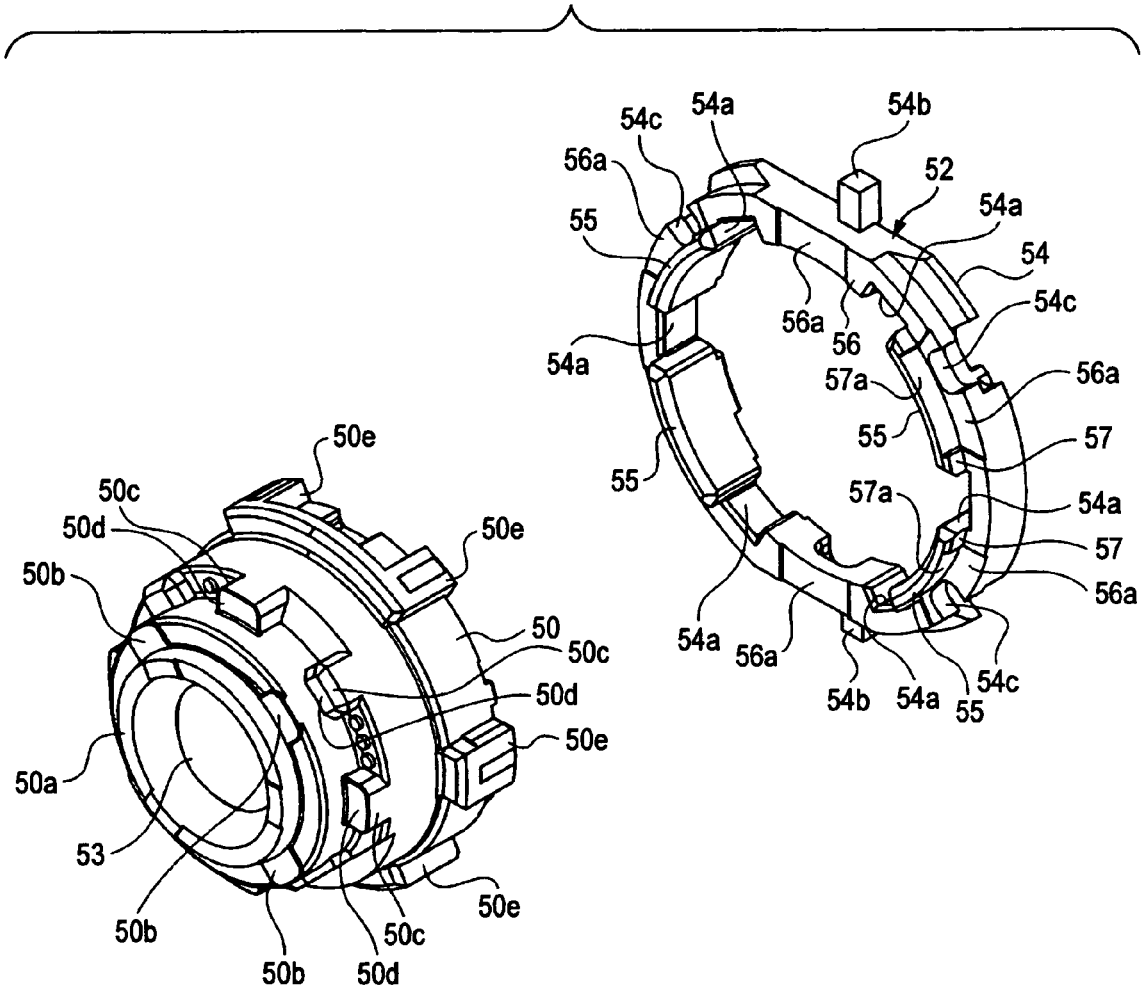
FIG. 15 is an enlarged disassembled perspective view showing a lens holder and a coil holder that hold a lens block.

As shown in FIG. 15, the lens holder 50 is formed in a substantially cylindrical shape with an axial direction thereof set in the optical axis direction. A positioning annular section 50a is provided at a front end of the lens holder 50. Holding ribs 50b projected slightly forward to be spaced apart at equal intervals in a peripheral direction of the lens holder 50 are provided in positions closer to the front end of the lens holder 50. In the lens holder 50, regulated ribs 50c are provided to be spaced apart at equal intervals in the peripheral direction in position on a rear side of the holding ribs 50b. Front surfaces of the regulated ribs 50c are formed as regulated surface sections 50d, respectively.

Figure 16:
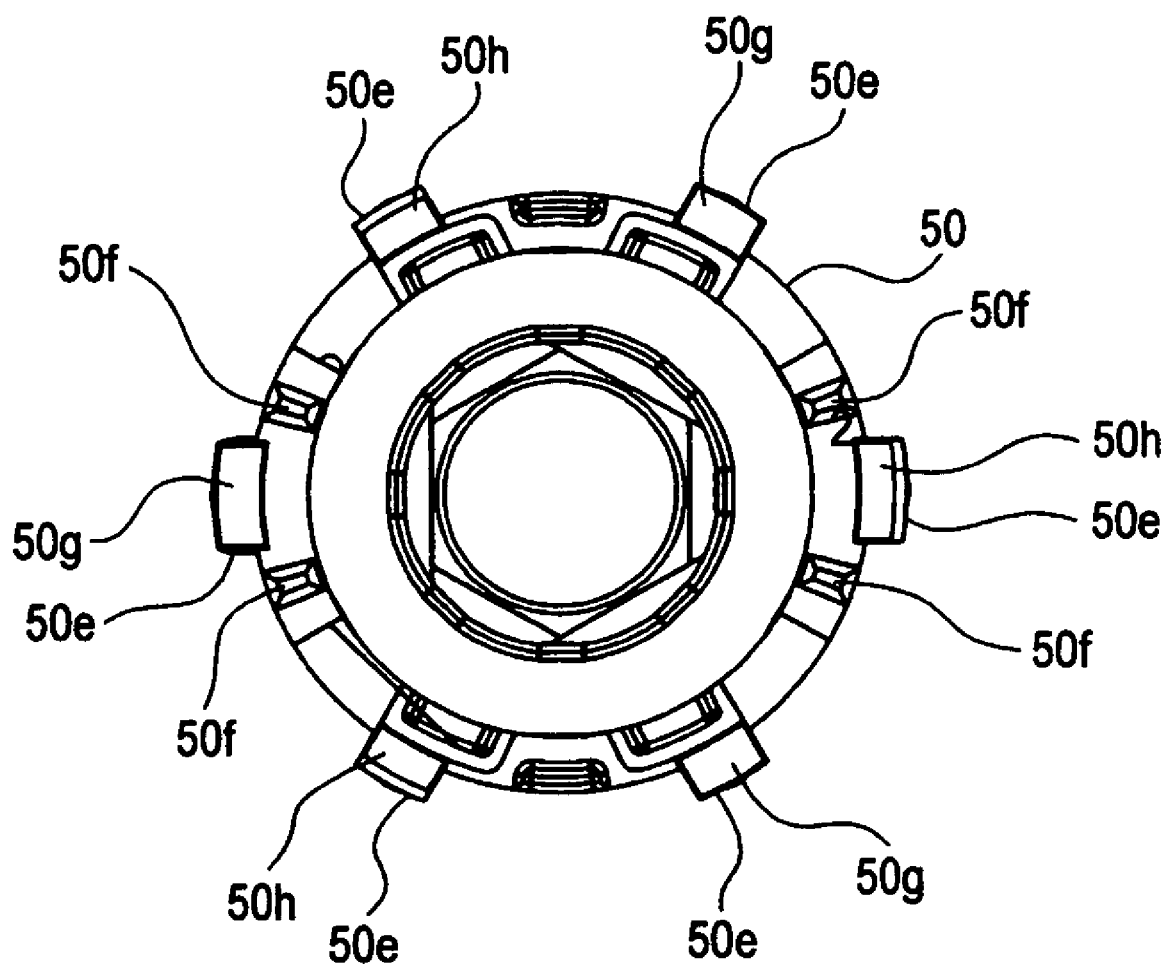
FIG. 16 is an enlarged rear view of the lens holder.

Fitting projections 50e are provided to be spaced apart in the peripheral direction at a rear end of the lens holder 50. As shown in FIG. 16, four positioning projections 50f are provided to be spaced apart in the peripheral direction in an outer peripheral section of a rear surface of the lens holder 50.

Three first regulated surface sections 50g and three second regulated surface sections 50h projected slightly backward are provided to be spaced apart in the peripheral direction, respectively, on the rear surface of the lens holder 50. The first regulated surface sections 50g and the second regulated surface sections 50h are provided in positions at equal intervals in the peripheral direction, respectively. The second regulated surface sections 50h are located among the first regulated surface sections 50g, respectively.

An amount of backward projection of the first regulated surface sections 50g is set slightly larger than an amount of backward projection of the second regulated surface sections 50h. A difference between both the amounts of projection is set to, for example, about 0.02 mm.

In the inside of the lens holder 50, plural movable lenses functioning as focus lenses and a lens block 53 having a fixed diaphragm and the like are attached (see FIGS. 3 and 6).

The driving coil 51 is formed to be wound in an annular shape. An outer diameter of the driving coil 51 is set smaller than an outer diameter of the driving magnet 48 (see FIGS. 3, 4, and 6).

The coil holder 52 includes a thin base section 54 formed in a substantially annular shape and holding projections 55 projected forward from an inner peripheral edge of the base section 54 (see FIG. 15).

In the base section 54, fitting recesses 54a are formed to be spaced apart in a peripheral direction of the base section 54 in an inner peripheral surface thereof. Projections for coil winding 54b projected upward and downward are provided at both upper and lower ends of the base section 54, respectively. Cutouts for adhesive application 54c are formed to be spaced apart in the peripheral direction in the base section 54. The cutouts for adhesive application 54c are opened forward, backward, and outward.

A front surface of the base section 54 is formed as a first attachment surface 56 to which the driving coil 51 is attached. Shallow bonding recesses 56a are formed to be spaced apart in the peripheral direction in the first attachment surface 56. The bonding recesses 56a are formed in positions corresponding to the cutouts for adhesive application 54c, respectively, except a part of the bonding recesses 56a.

The holding projections 55 are provided in positions corresponding to the bonding recesses 56a, respectively. Outer surfaces of the holding projections 55 are formed as a second attachment surface 57 to which the driving coil 51 is attached. Shallow bonding recesses 57a are formed in the second attachment surface 57. The bonding recesses 57a are formed to continue to the bonding recesses 56a formed in the base section 54, respectively.

The movable unit 49 is constituted by attaching the driving coil 51 and the lens holder 50, to which the lens block 53 is attached, to the coil holder 52 (see FIG. 3).

The driving coil 51 is attached to the first attachment surface 56 and the second attachment surface 57 of the coiled holder 52 by bonding. Attachment of the driving coil 51 to the coil holder 52 is performed as described below (see FIGS. 17 to 19)

Figure 17:
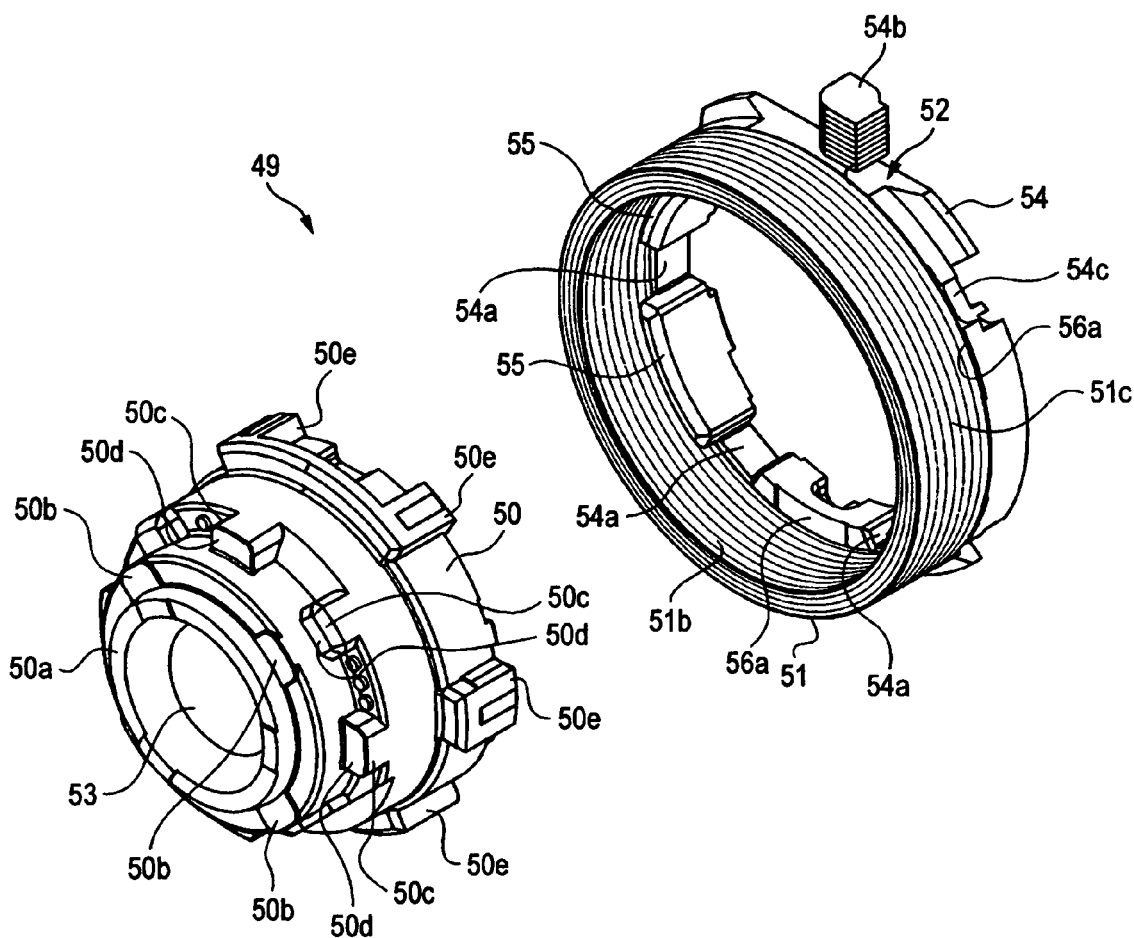
FIG. 17 is an enlarged disassembled perspective view showing the lens holder and the coil holder to which a driving coil is attached.
Figure 18:
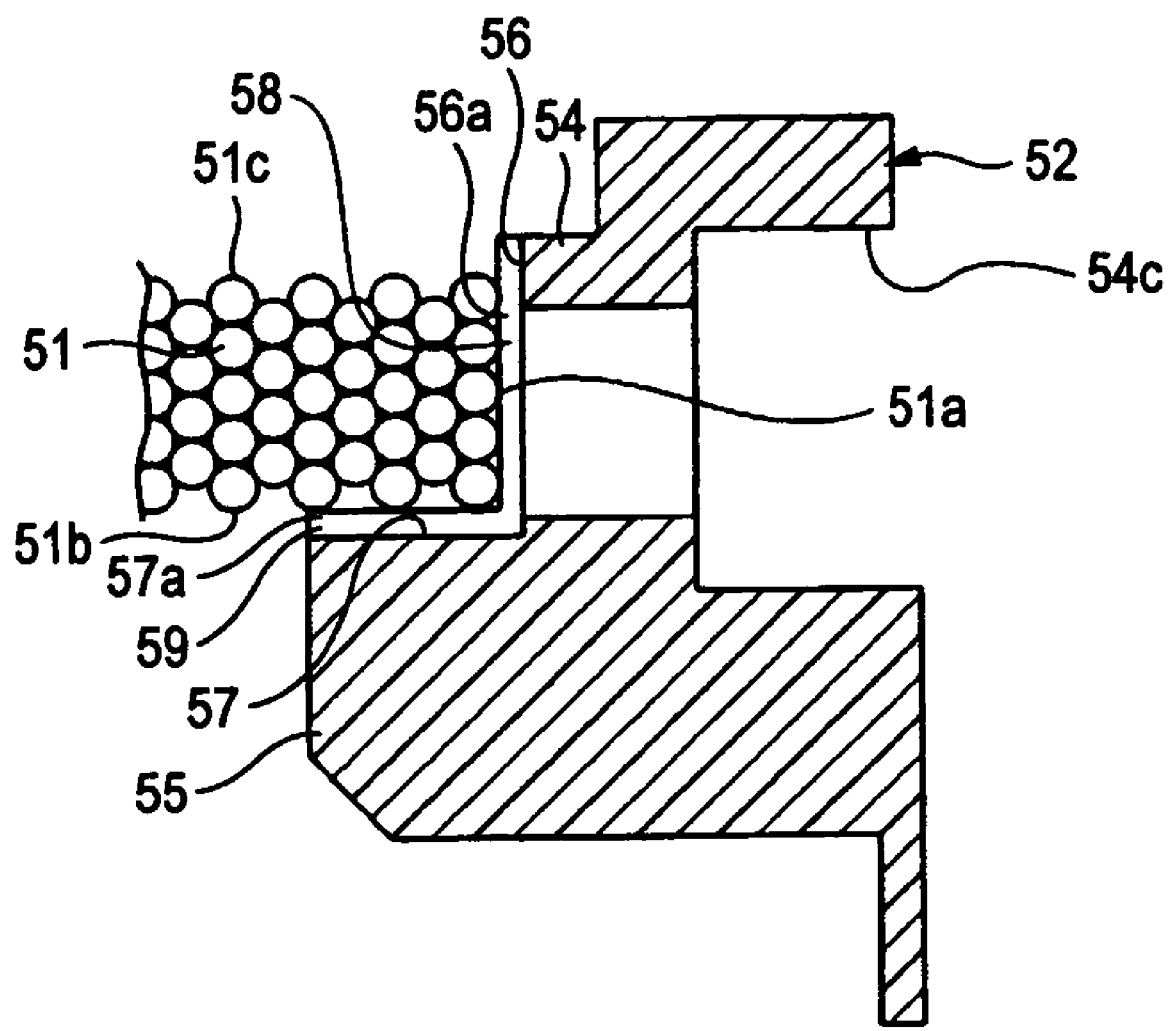
FIG. 18 is an enlarged sectional view showing a state before the driving coil is bonded to the coil holder.

First, one end face 51a in an axial direction of the driving coil 51 is bumped against the first attachment surface 56 of the coil holder 52 to couple the driving coil 51 to the coil holder 52 (see FIG. 17). In a state in which one end face 51a of the driving coil 51 is bumped against the first attachment surface 56, an inner peripheral surface 51b of the driving coil 51 is in contact with outer peripheral surfaces of the holding projections 55. In this state, as shown in FIG. 18, gaps 58 are formed between the one end face 51a of the driving coil 51 and the base section 54 by the bonding recesses 56a formed in the first attachment surface 56. Gaps 59 are formed between the inner peripheral surface 51b of the driving coil 51 and the holding projections 55 by the bonding recesses 57a formed in the second attachment surface 57. In this case, a part of one end face 51a of the driving coil 51 is in a position facing the cutouts for adhesive application 54c of the coil holder 52.

Figure 19:
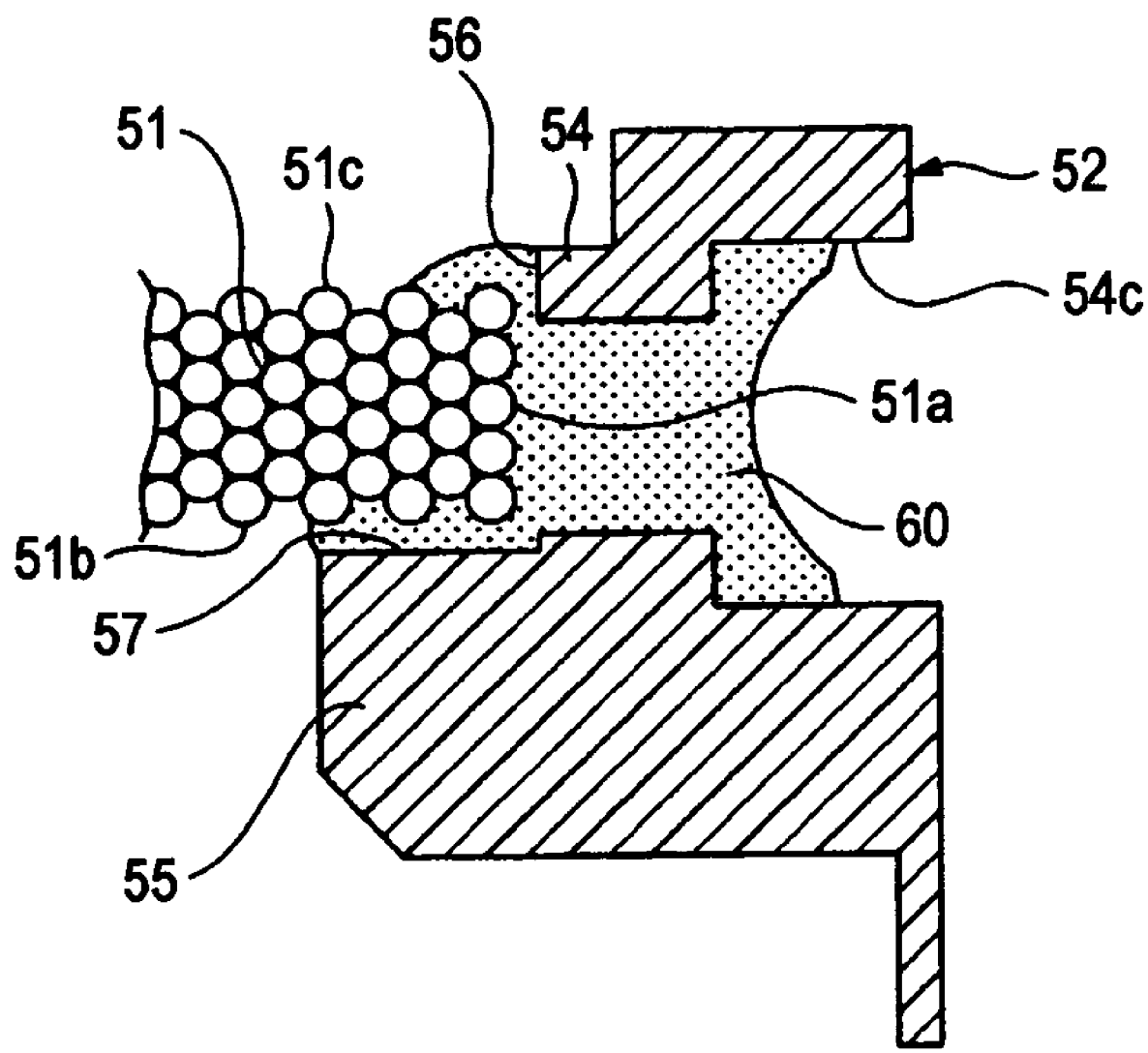
FIG. 19 is an enlarged sectional view showing a state in which the driving coil is bonded to the coil holder.

An adhesive 60 is filled in the cutouts for adhesive application 54c of the coil holder 52 (see FIG. 19).

The adhesive 60 filled in the cutouts for adhesive application 54c is infiltrated into the gaps 58 and 59 and deposited on the one end face 51a and the inner peripheral surface 51b of the driving coil 51. The adhesive 60 infiltrated through the gaps 58 penetrates to the outer peripheral surface 51c side of the driving coil 51 to be deposited on the outer peripheral surface 51c.

As the adhesive 60 is hardened, the driving coil 51 is fixed to the coil holder 52.

When, for example, a heat-hardening adhesive is used as the adhesive 60, the driving coil 51 and the coil holder 52 are put in a heat treat furnace and heated for a predetermined time, for example, 30 minutes to harden the adhesive 60.

In general, the heat-hardening adhesive has high permeability. Thus, when the heat-hardening adhesive is used as the adhesive 60, there is an advantage that the adhesive 60 easily penetrates to the inner peripheral surface 51b and the outer peripheral surface 51c of the driving coil 51.

When, for example, an ultraviolet curing adhesive is used as the adhesive 60, an ultraviolet ray is irradiated on the adhesive 60 for a predetermined time to harden the adhesive 60.

In general, the ultraviolet curing adhesive hardens in a short time, for example, about five to thirty seconds by irradiation of an ultraviolet ray. Thus, when the ultraviolet curing adhesive is used as the adhesive 60, it is possible to realize a substantial reduction of time for an assembly process of the imaging unit 10 including the lens unit 10a through a reduction of a hardening time.

As described above, in the imaging device 1, the two surfaces, one end surface 51a and the inner peripheral surface 51b of the driving coil 51, are attached to the first attachment surface 56 and the second attachment surface 57 having different angles of the coil holder 52, respectively. Thus, adhesive strength is high, attachment strength of the driving coil 51 to the coil holder 52 is improved, and, when, for example, the imaging device 1 is dropped and a strong impact occurs, it is possible to prevent a fall of the driving coil 51 from the coil holder 52.

In addition to the one end face 51a and the inner peripheral surface 51b of the driving coil 51, the outer peripheral surface 51c is also bonded to the coil holder 52 by the adhesive 60. Thus, it is possible to realize improvement of attachment strength of the driving coil 51 to the coil holder 52.

In the example described above, the holding projections 55 projected from the inner peripheral edge of the base section 54 of the coil holder 52 is provided to bond the driving coil 51 to the coil holder 52. Conversely, holding projections projected from an outer peripheral edge of the base section 54 of the coil holder 52 may be provided to bond the driving coil 51 to the coil holder 52. Holding projections projected from both the inner peripheral edge and the outer peripheral edge of the base section 54 of the coil holder 52 may be provided to bond the driving coil 51 to the coil holder 52.

Since the gaps 58 and 59 for infiltrating the adhesive 60 are formed in the first attachment surface 56 and the second attachment surface 57 of the coil holder 52, respectively, the adhesive 60 surely penetrates to one end face 51a and the inner peripheral surface 51b of the driving coil 51 to be deposited on one end face 51a and the inner peripheral surface 51b. Thus, it is possible to realize improvement of reliability in bonding of the driving coil 51 to the coil holder 52.

Since the cutouts for adhesive application 54c for filling the adhesive 60 in the coil holder 52 are formed, it is possible to easily perform bonding work.

Figure 20:
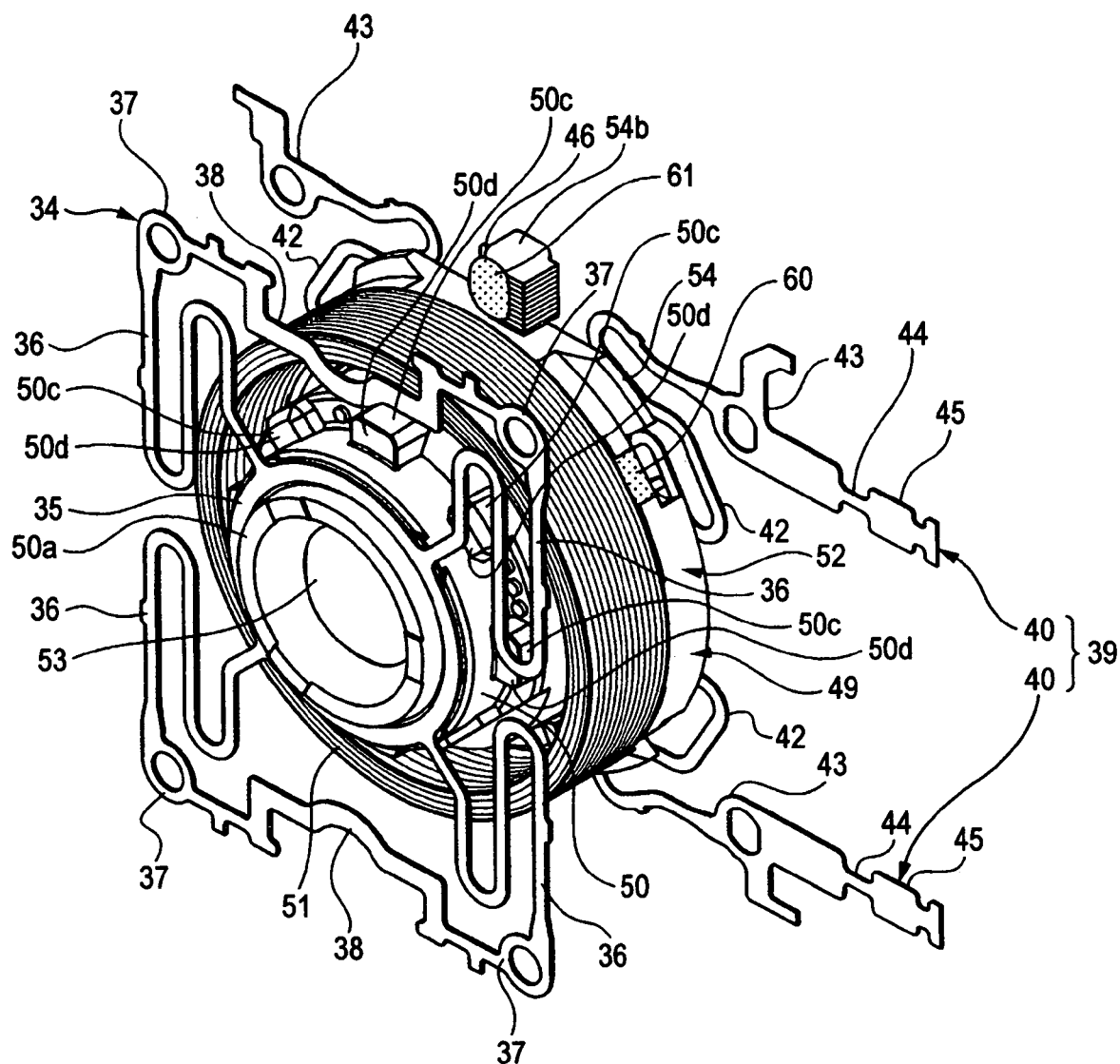
FIG. 20 is an enlarged perspective view showing a state in which the first urging leaf spring and the second urging leaf spring are attached to a movable unit.
Figure 21:
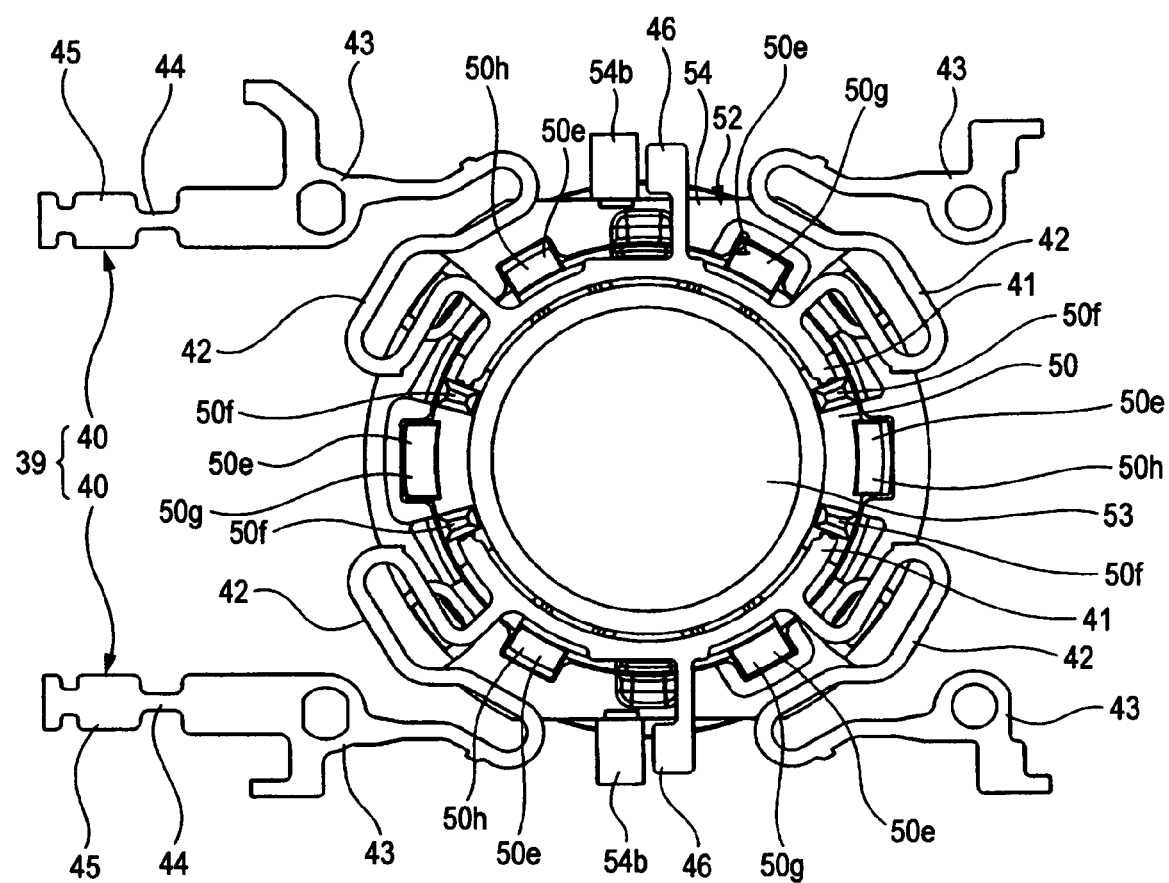
FIG. 21 is an enlarged rear view showing a state in which the second urging leaf spring is attached to the movable unit.
Figure 22:
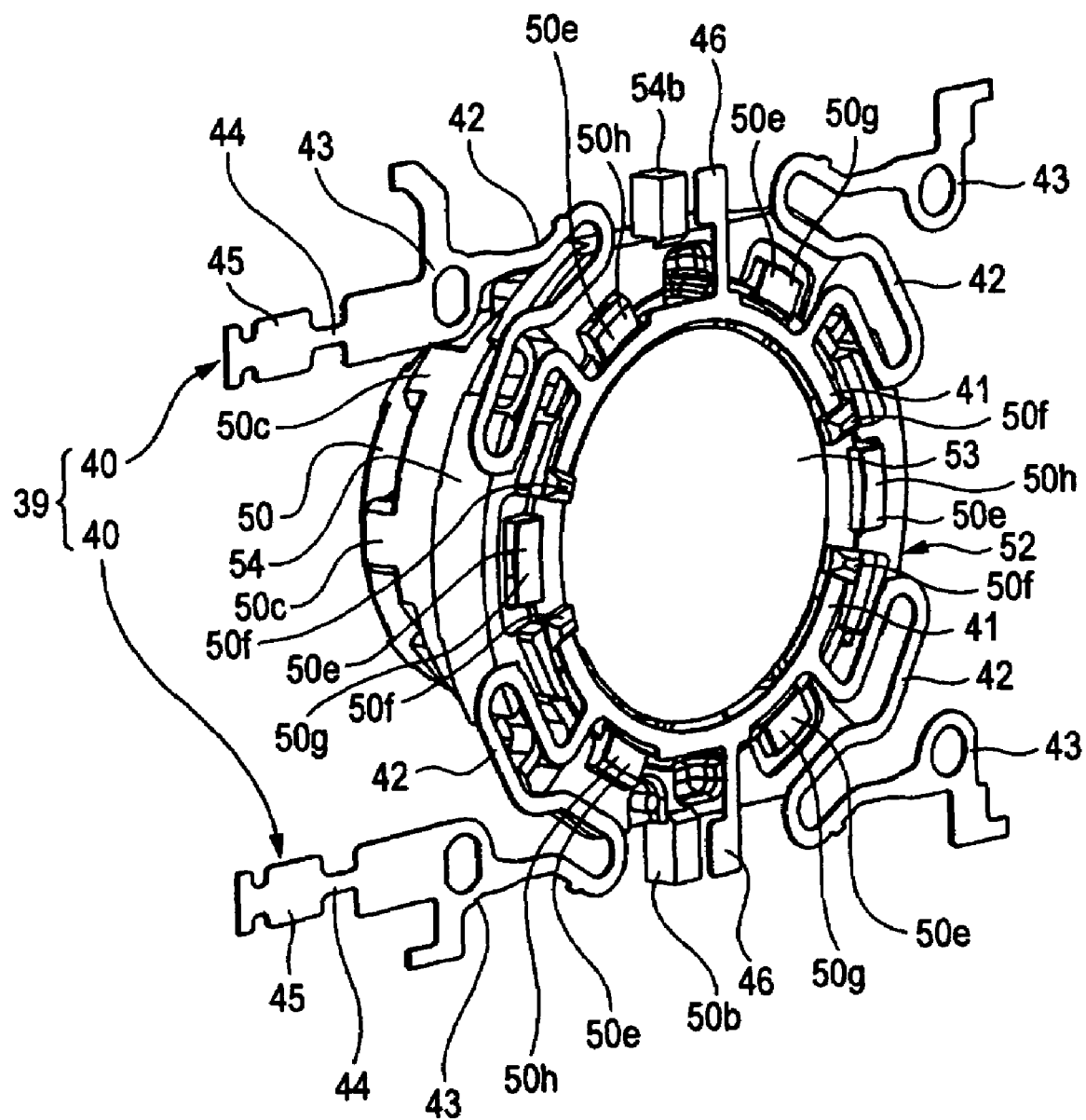
FIG. 22 is an enlarged perspective view showing, with illustration of the driving coil omitted, a state in which the second urging leaf spring is attached to the movable unit.

The movable unit 49 is held by the holding section 35 of the first urging leaf spring 34 and the holding sections 41 of the second urging leaf spring 39 (see FIGS. 20 to 22).

As shown in FIG. 20, the holding section 35 of the first urging leaf spring 34 is externally fitted to the positioning annular section 50a and brought into contact with front surfaces of the holding ribs 50b to be the attached to the lens holder 50. As shown in FIGS. 21 and 22, the holding sections 41 of the second urging leaf spring 39 are arranged among the positioning projections 50f on an upper side or a lower side of the rear surface of the lens holder 50, respectively, to be attached to the coil holder 52.

In a state in which the second urging leaf spring 39 is attached to the lens holder 50, the coil connecting sections 46 of the second urging leaf spring 39 are located adjacent to the coil winding projections 54b of the coil holder 52, respectively. Respective ends of the driving coil 51 wound around the coil winding projections 54b and the coil connecting sections 46 are connected by solder 61.

A light shielding sheet 62 and an imaging section 63 are attached to the second member 13 (see FIGS. 3 and 4).

The light shielding sheet 62 has a through hole 62a in the center and is arranged in the arrangement recess 26 formed in the rear surface 23a of the second member 13 and attached to the second member 13 (see FIG. 6).

The imaging section 63 includes an imaging housing 64, a control circuit board 65, an imaging element 66, and a cover 67.

A shallow recess 64a opened forward is formed in the imaging housing 64. The imaging element 66 is arranged in the recess 64a. As the imaging element 66, for example, a CCD (Charge Coupled Device) or a MOS (Complementary Metal Oxide Semiconductor) is used.

The control circuit board 65 is a circuit board for controlling the imaging element 66 and supplying electric power to the driving coil 51. Connecting sections 65a projected forward to be spaced apart vertically are provided at a right end thereof (see FIGS. 3 and 4). The control circuit board 65 is attached to a rear surface of the imaging housing 64. When the control circuit board 65 is attached to the imaging housing 64, positioning of the control circuit board 65 with respect to the second member 13 is performed by the positioning projections 28 provided in the second member 13.

A cover 67 is attached to a front surface of the imaging housing 64 and protects the imaging element 66.

The imaging section 63 is attached to the rear surface 23a of the second member 13 in a state in which the light shielding sheet 62 is arranged in the second member 13.

A procedure for assembling the imaging unit 10 will be explained.

First, the second urging leaf spring 39 is assembled to the second member 13. Assembling of the second urging leaf spring 39 to the second member 13 is performed, as described above, by inserting the caulking pins 30 of the second member 13 through the positioning holes 43a and 43b formed in the attachment sections 43 of the spring members 40, respectively, and caulking the caulking pints 30. In this case, the fold sections 44 and the connection terminal sections 45 of the second urging leaf spring 39 are projected sideward from the spring bearings 31 of the second member 13, respectively.

The movable unit 49 is assembled to the second urging leaf spring 39. In a state in which the movable unit 49 is assembled to the second urging leaf spring 39, as described above, the movable unit 49 is held by the holding section 41 of the second urging leaf spring 39.

Subsequently, the yoke 47 attached with the driving magnet 48 is assembled to the second member 13. The yoke 47 is assembled to be fitted in an inner side of the second member 13. The yoke 47 is arranged in a state in which a rear end face thereof is bumped against a predetermined portion of an inner surface of the second member 13 (see FIG. 6). In a state in which the yoke 47 is assembled to the second member 13, the driving coil 51 is located between the inner peripheral section 47c of the yoke 47 and the driving magnet 48.

Since the driving coil 51 is arranged between the inner peripheral section 47c of the yoke 47 and the driving magnet 48 in this way, a linear actuator 68 is constituted by the driving magnet 48 and the driving coil 51 (see FIG. 6).

The first urging leaf spring 34 is assembled to the movable unit 49. Assembling of the first urging leaf spring 34 to the movable unit 49 is performed, as described above, by externally fitting the holding section 35 in the positioning annular section 50a. In a state in which the first urging leaf spring 34 is assembled to the movable unit 49, the positioning pins 32 of the second member 13 are inserted into the attachment holes 37a of the attachment sections 37 of the first urging leaf spring 34, respectively.

The first member 12 is assembled to the second member 13 to couple the first member 12 and the second member 13. Assembling of the first member 12 to the second member 13 is performed by sliding the first member 12 backward with respect to the second member 13. The guide grooves 21 formed in the projections 15 of the first member 12 are guided to the guiding projections 33 provided in the projections 24 of the second member 13. Thus, it is possible to smoothly and surely couple the first member 12 and the second member 13.

Figure 24:
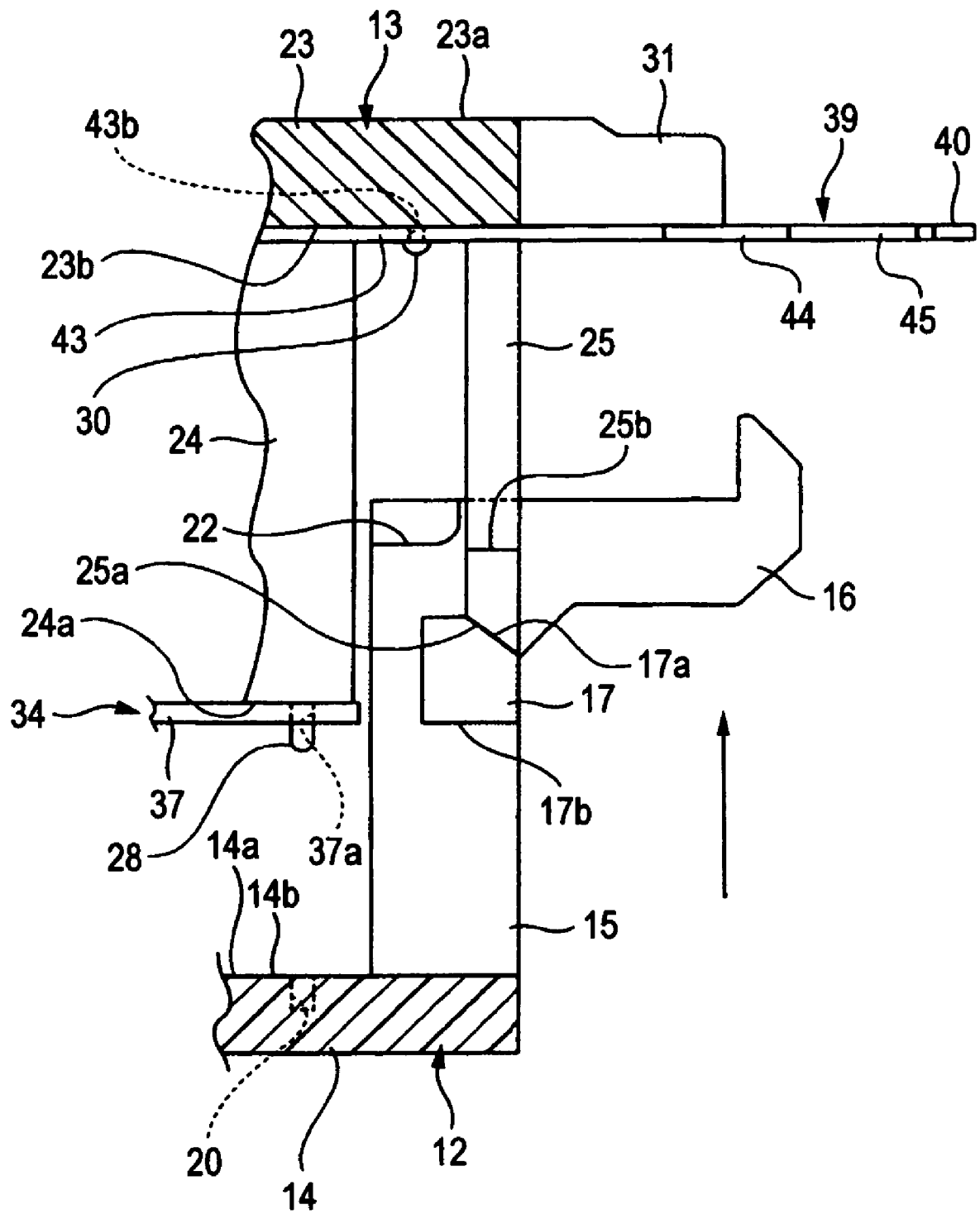
FIG. 24 is an enlarged sectional view showing, in conjunction with FIGS. 25 to 27, a state in which the first member and the second member are coupled and showing a state in which the first member is slid with respect to the second member and inclined planes of respective fixing pieces are in contact with each other.

When the first member 12 is slid with respect to the second member 13, the inclined planes 17a of the fixing pieces 17 of the first member 12 and the inclined planes 25a of the fixing pieces 25 of the second member 13 come into contact with each other during the sliding (see FIG. 24).

Figure 25:
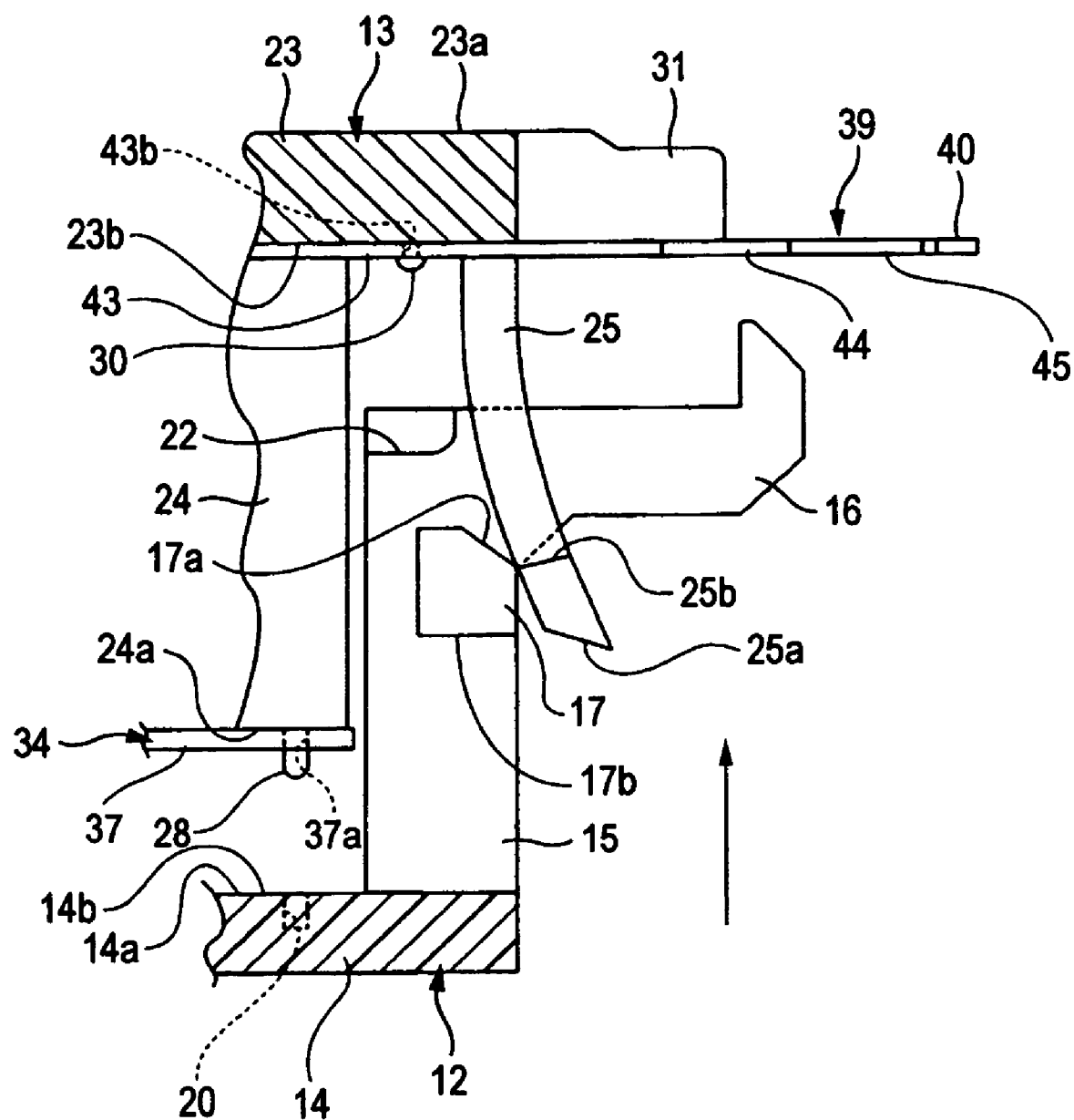
FIG. 25 is an enlarged sectional view showing a state in which the first member is further slid with respect to the second member and the fixing piece of the second member is elastically deformed.

When the first member 12 is further slid with respect to the second member 13, as shown in FIG. 25, the fixing pieces 17 and the fixing pieces 25 are brought into sliding contact with each other. The inclined planes 25a move onto the inclined planes 17a, respectively. The fixing pieces 25 are elastically deformed to bend outward.

Figure 26:
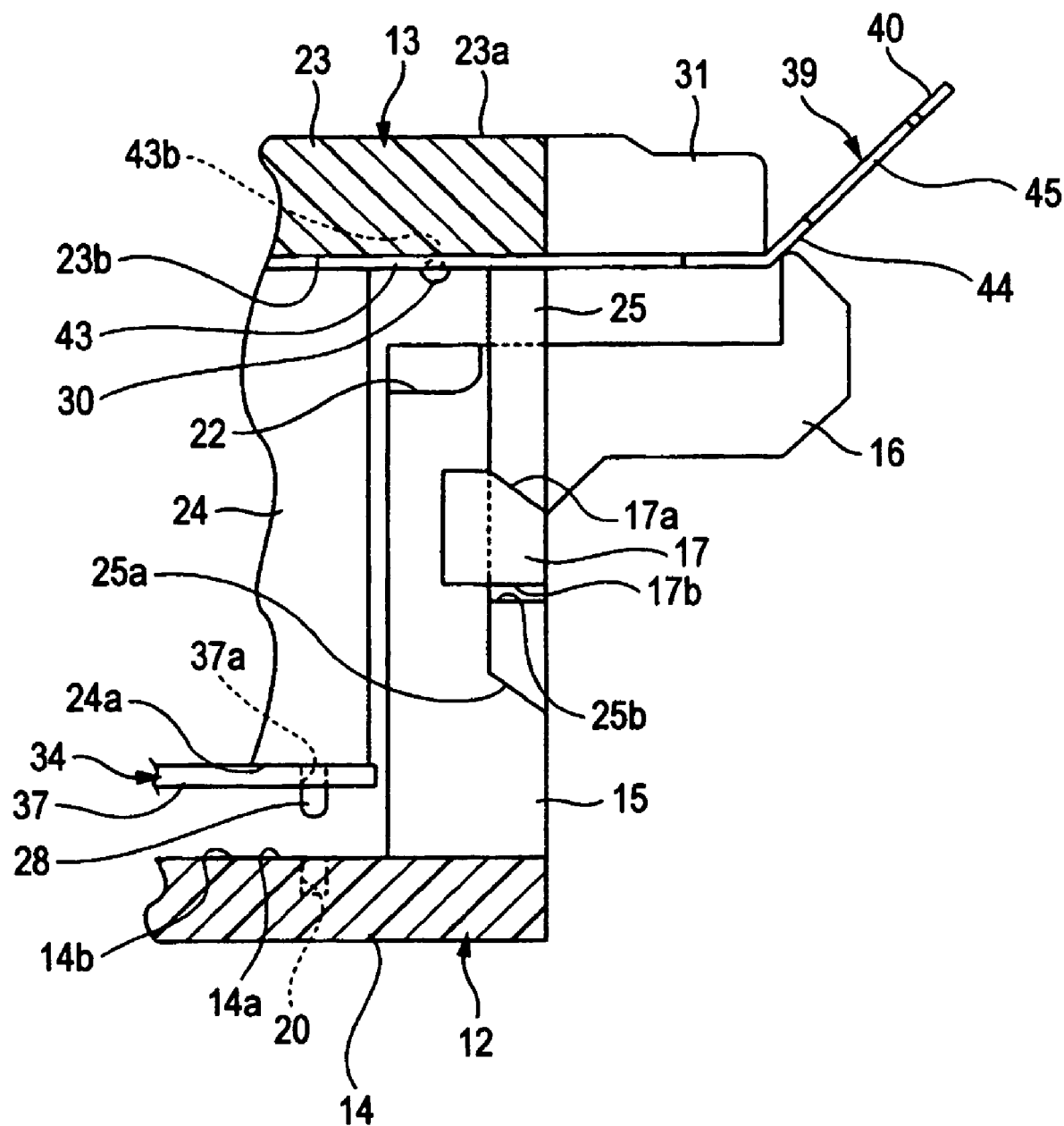
FIG. 26 is an enlarged sectional view showing a state in which the first member is further slid with respect to the second member and the fixing piece of the second member elastically deformed is elastically restored.

When the first member 12 is further slid with respect to the second member 13, as shown in FIG. 26, a sliding-contact state of the fixing pieces 17 and the fixing pieces 25 is released. The fixing pieces 25 bending outward are elastically restored to return to an original state thereof.

Figure 27:
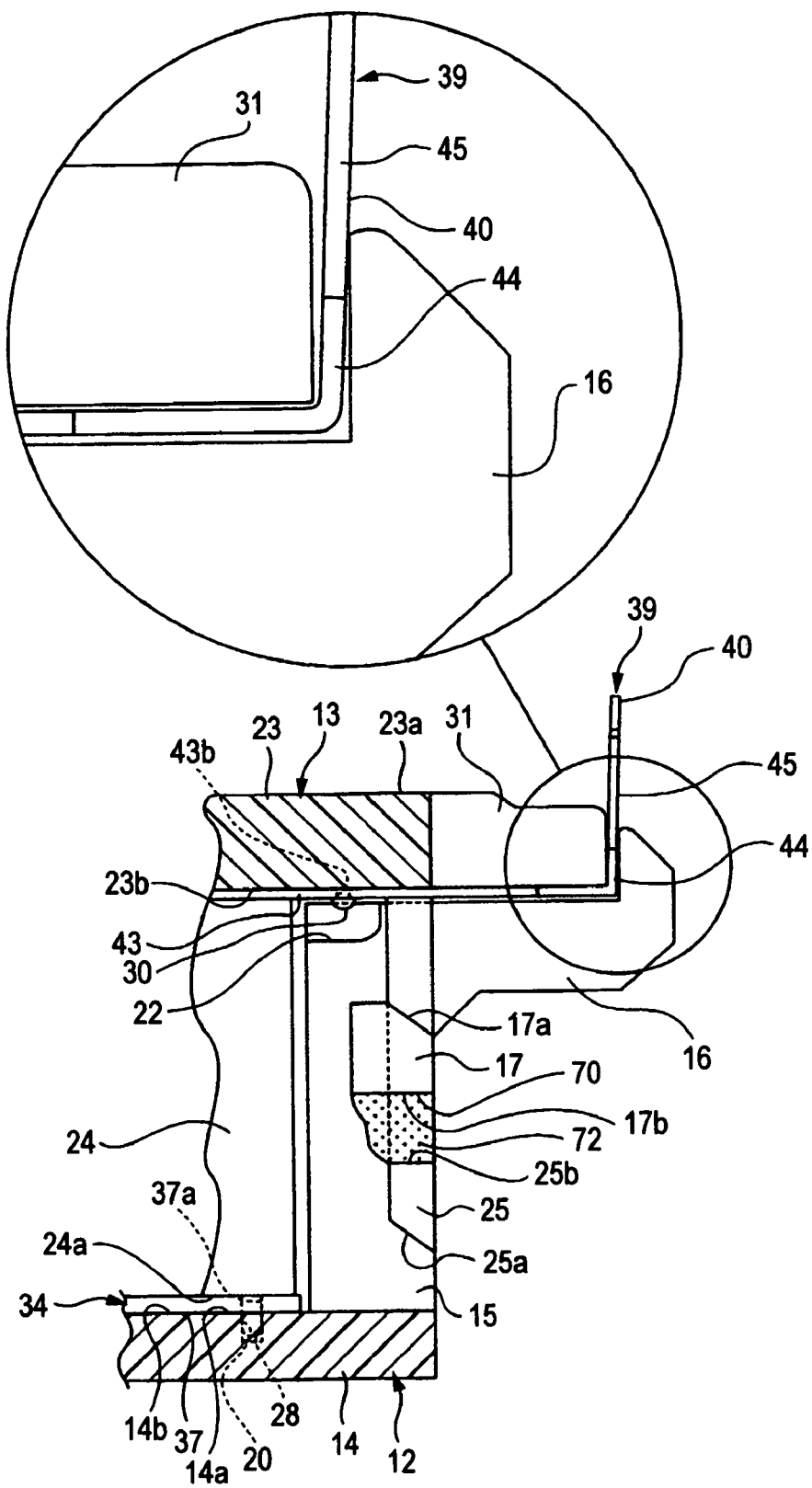
FIG. 27 is an enlarged sectional view showing a state in which the first member is further slid with respect to the second member and the first member and the second member are coupled.

When the first member 12 is further slid with respect to the second member 13, as shown in FIG. 27, the connection terminal sections 45 of the second urging leaf spring 39 are pressed backward by the spring bent sections 16 of the first member 12, respectively. The fold sections 44, a part of which is received by the spring bearings 31 of the second member 13, are bent. The connection terminal sections 45 are bent substantially perpendicularly.

Figure 23:
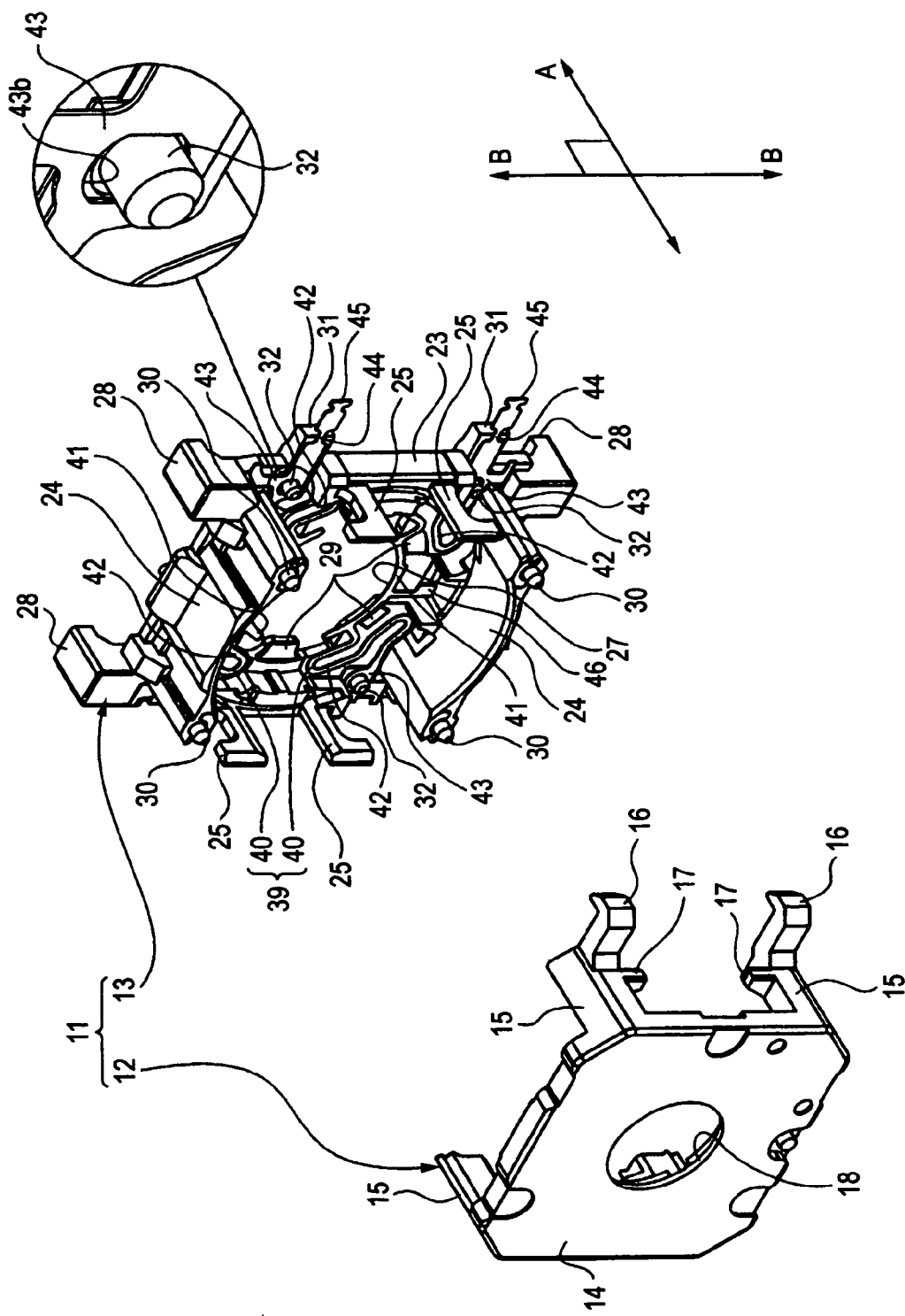
FIG. 23 is an enlarged perspective view showing the first member and the second member to which the second urging leaf spring is coupled.

In this case, in the second urging leaf spring 39, the positioning holes 43b are formed long in a direction (a B direction shown in FIG. 23) orthogonal to a bending direction of the connection terminal sections 45 (an A direction shown in FIG. 23), respectively (see an enlarged view of FIG. 23). Therefore, since the positioning holes 43b are not formed long in the same direction as the bending direction of the connection terminal sections 45, respectively. Thus, when the connection terminal sections 45 are bent, the second urging leaf spring 39 positioned in the second member 13 does not deviate to move in the horizontal direction according to this bending. It is possible to prevent positional deviation of the second urging leaf spring 39 with respect to the second member 13.

In a state in which the connection terminal sections 45 are bent substantially perpendicularly, bent portions of the fold sections 44 are slightly rounded (see an enlarged view of FIG. 27) to prevent the fold sections 44 from being folded and cut.

Sliding of the first member 12 with respect to the second member 13 ends, as shown in FIG. 27, as the spring nip surfaces 24a formed in the projections 24 of the second member 13 are bumped against a rear surface of the first urging leaf spring 34 attached to the movable unit 49 and a front surface of the first urging leaf spring 34 is bumped against the spring nip surfaces 14b formed in the base surface section 14 of the first member 12.

In this case, the positioning pins 32 of the second member 13 are inserted into the attachment holes 37a of the first urging leaf spring 34, respectively and further inserted into the positioning holes 20 of the first member 12.

In the first urging leaf spring 34, the attachment sections 37 are nipped by the spring nip surfaces 14b of the first member 12 and the spring nip surfaces 24a of the second member 13 and attached to the lens barrel 11.

In this way, the attachment sections 37 of the first urging leaf spring 34 are nipped by the spring nip surfaces 14b and the spring nip surfaces 24a and fixed to the lens barrel 11. Thus, a process such as bonding for fixing the first urging leaf spring 34 to the lens barrel 11 is not specifically necessary. It is possible to realize improvement of workability in an assembly process of the imaging unit 10 including the lens unit 10a.

It is also conceivable to fix the first urging leaf spring 34 and the second urging leaf spring 39 to the lens barrel 11 by, for example, in a state in which the first member 12 and the second member 13 are coupled, simultaneously nipping the first urging leaf spring 34 and the second urging leaf spring 39 with the respective sections of the first member 12 and the respective sections of the second member 13. However, in this case, it is likely that a state of fixing to the first urging leaf spring 34 or the second urging leaf spring 39 becomes unstable because of a dimension error in machining of the first member 12 and the second member 13 and an assembly error of the members.

Therefore, as described above, the attachment sections 37 of the first urging leaf spring 34 are nipped by the spring nip surfaces 14b and the spring nip surfaces 24a and fixed to the lens barrel 11. The second urging leaf spring 39 is fixed to the lens barrel 11 by caulking the caulking pins 30. Consequently, it is possible to realize stabilization of a state of fixing of the first urging leaf spring 34 and the second urging leaf spring 39 to the lens barrel 11 regardless of a dimension error in machining of the first member 12 and the second member 13 and an assembly error of the members.

In a state in which the first member 12 and the second member 13 are coupled to constitute the lens barrel 11 as described above, as shown in FIG. 27, tip surfaces of the projections 15 of the first member 12 are located near the attachment sections 43 of the second urging leaf spring 39, respectively. The caulking pins 30 caulked are located in the clearance recesses 22 formed at tips of the projections 15, respectively. Therefore, interference of the caulking pins 30 and the projections 15 is prevented.

In the example described above, the caulking pins 30 are provided in the second member 13 to fix the second urging leaf spring 39 to the second member 13 and the spring nip surfaces 14b and the spring nip surfaces 24a are formed in the first member 12 and the second member 13, respectively, to fix the first urging leaf spring 34. Conversely, it is also possible that caulking pins are provided in the first member 12 to fix the first urging leaf spring 34 to the first member 12 and spring nip surfaces are formed in the first member 12 and the second member 13, respectively, to fix the second urging leaf spring 39.

The light shielding sheet 62 and the imaging section 63 are attached to the second member 13. In a state in which the imaging section 63 is attached to the second member 13, tips of the connecting sections 65a of the control circuit board 65 are located in contact with or near the connection terminal sections 45 of the second urging leaf spring 39, respectively.

As described above, in the imaging device 1, the spring bending sections 16 and the spring bearings 31 for folding the connection terminal sections 45 in a direction in which the connection terminal sections 45 approach the connecting sections 65a, respectively at the time of coupling of the first member 12 and the second member 13 is provided. Thus, besides work for coupling the first member 12 and the second member 13, folding work for folding the connection terminal sections 45 in the direction in which the connection terminal sections 45 approach the connecting sections 65a, respectively, is unnecessary. It is possible to realize improvement of workability in assembly work for the imaging device 1.

The width of the fold sections 44 is set smaller than the width of the attachment sections 43 and the connection terminal sections 45 adjacent to each other. Thus, the fold sections 44 are easily bent. It is possible to surely bend the fold sections 44 with a small force to fold the connection terminal sections 45 at the time of coupling of the first member 12 and the second member 13.

The fold sections 44 are formed in a linear shape that extends in a direction in which the attachment sections 43 and the connection terminal sections 45 are coupled and has a fixed width. Thus, stress concentration less easily occurs in a bent portion at the time of bending and it is possible to prevent the fold sections 44 from being cut.

Subsequently, the connecting sections 65a of the imaging section 63 attached to the second member 13 and the connection terminal sections 45 of the second urging leaf spring 39 are connected by solder 69.

Figure 28:
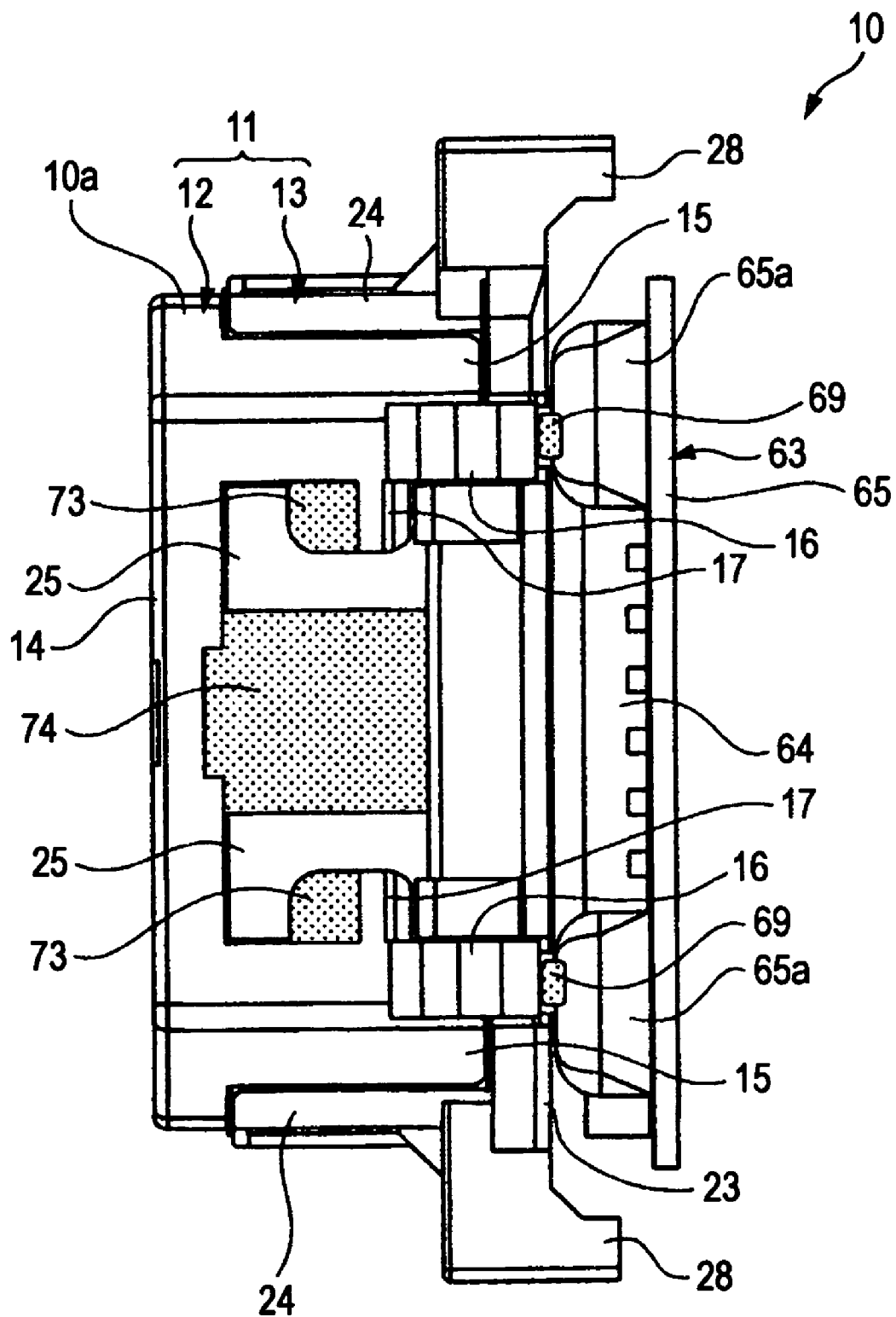
FIG. 28 is an enlarged side view of the imaging unit.

In a state in which the first member 12 is slid with respect to the second member 13 and the members are coupled as described above, as shown in FIGS. 5 and 28, the fixing pieces 17 of the first member 12 are located behind the fixing pieces 25 of the second member 13. The opposed surfaces 17b formed at front ends of the fixing pieces 17 and the opposed surfaces 25b formed at rear ends of the fixing pieces 25 are located to be opposed to each other.

As shown in FIG. 27, first fixing spaces 70 are formed between the fixing pieces 17 of the first member 12 and the fixing pieces 25 of the second member 13. Second fixing spaces 71 are formed between the fixing pieces 25 located above and below the second fixing spaces 71. The outer peripheral section 47b of the yoke 47 is located in a position corresponding to the second fixing spaces 71 (see FIG. 6).

In a state in which the first member 12 and the second member 13 are coupled, fixed gaps 72 are formed between the rear surface 14a of the base surface section 14 of the first member 12 and the base 47a of the yoke 47. The gaps 72 communicate with the second fixing spaces 71 (see FIG. 6).

For example, an adhesive 73 is filled in the first fixing spaces 70 formed in the lens barrel 11 as fixing means. The adhesive 73 plays a role as fixing means for fixing the first member 12 and the second member 13. The adhesive 73 is, for example, an ultraviolet curing adhesive.

An adhesive 74 is filled in the second fixing spaces 71 formed in the lens barrel 11. The adhesive 74 is, for example, an ultraviolet curing adhesive. As the adhesive 73 filled in the first fixing spaces 70 is hardened, the first member 12 and the second member 13 are fixed.

The adhesive filled in the second fixing spaces 71 also penetrates into the gaps 72 formed between the rear surface 14a of the base surface section 14 and the base 47a of the yoke 47 from the second fixing spaces 71. As the adhesive 74 is hardened in the second fixing spaces 71, the first member 12, the second member 13, and the yoke 47 are bonded and fixed (see FIG. 6). As the adhesive 74 is hardened in the gaps 72, the first member 12 and the yoke 47 are bonded and fixed.

As described above, in the lens unit 10a, the first member 12 and the second member 13 are bonded by the adhesive 73 applied in the first fixing spaces 70. In this case, a direction in which the coupling of the first member 12 and the second member 13 is released is a direction in which the fixing pieces 17 located behind are moved forward and a direction in which the fixing pieces 25 located in front are moved backward. Thus, the direction is a direction in which the adhesive 73 is compressed by the fixing pieces 17 and the fixing pieces 25.

Therefore, for example, even when the imaging device 1 is dropped and a strong impact occurs, the adhesive 73 less easily peels away from the fixing pieces 17 and 25 and the coupling state of the first member 12 and the second member 13 is stabilized. Thus, it is possible to realize improvement of resistance against vibration and resistance against drop impact.

Respective bonding surfaces of the fixing pieces 17 and 25 are the opposed surfaces 17b and 25b opposed in the direction in which the coupling of the first member 12 and the second member 13 is released. Thus, when the first member 12 and the second member 13 are about to be separated, a direction of a force applied to the members and a direction of a compression force applied from the fixing pieces 17 and the fixing pieces 25 to the adhesive 73 are set to coincide with each other. Thus, it is possible to realize improvement of fixing strength between the first member 12 and the second member 13.

In the example described above, the adhesive 73 is filled in the first fixing spaces 70 to fix the first member 12 and the second member 13. However, fixing means filled in the first fixing spaces 70 is not limited to the adhesive 73. It is possible to use arbitrary fixing means as long as, when a force is generated in the direction in which the coupling of the first member 12 and the second member 13 is released and a compression force is applied to the fixing means, the fixing means is less easily deformed by the compression force. For example, it is conceivable to insert members (fixing means) or the like formed of a resin material or a metal material in the first fixing spaces 70 to be fit therein.

However, when the adhesive 73 is used as fixing means as described above, the first fixing spaces 70 are sealed. Thus, there is an effect that it is possible to prevent entrance of dust into the lens barrel 11 and realize simplification of fixing work.

It is generally known that the ultraviolet curing adhesive used as the adhesive 73 has a small contraction factor after hardening. It is possible to surely fix the first member 12 and the second member 13 by using the ultraviolet curing adhesive as the adhesive 73.

In the lens unit 10a, the first member 12, the second member 13, and the yoke 47 are bonded by the adhesive 74 filled in the second fixing space 71 and the first member 12 and the yoke 47 are bonded by the adhesive 74 penetrating into the gaps 72. Therefore, bonding strength between the first member 12, the second member 13, and the yoke 47 is high and it is possible to realize improvement of resistance against vibration and resistance against drop impact.

It is also possible to use, for example, an epoxy resin adhesive as the adhesive 73. However, when the epoxy resin adhesive is a two-part adhesive, although hardening speed is high, there is a disadvantage that handling is complicated. When the epoxy resin adhesive is a one-part adhesive, although handling is easy, there is a disadvantage that hardening speed is low. Therefore, by using the ultraviolet curing adhesive as the adhesive 73 and the adhesive 74 as described above, it is possible to realize simplification of handling of the adhesive and reduction of a bonding process. In particular, whereas a hardening time is equal to or longer than thirty minutes when the epoxy resins adhesive is used, a hardening time is five seconds to thirty seconds when the ultraviolet curing adhesive is used. Thus, time for an assembly process of the imaging unit 10 including the lens unit 10a is substantially reduced.

When a one-part thermosetting epoxy resin adhesive is used, in addition to a long hardening time, it is likely that, since a special-purpose heat treat furnace is necessary, a steep rise in manufacturing cost is caused and inconveniences such as eccentricity of a lens due to heat treatment are caused. However, it is also possible to prevent occurrence of such inconveniences by using the ultraviolet curing adhesive as the adhesive 73 and the adhesive 74.

Moreover, in general, it is known that the ultraviolet curing adhesive is inferior in strength of bonding to metal compared with strength of bonding to resin. However, as described above, in addition to bonding of the yoke 47 formed of a metal material and the first member 12 and the second member 13 formed of a resin material, the first member 12 and the second member 13 both formed of a resin material are bonded by the adhesive 74. Thus, it is possible to secure a state of firm fixing of the yoke 47 to the lens barrel 11.

The first member 12 and the second member 13 are coupled and fixed as described above to complete assembly of the imaging unit 10.

As described above, it is possible to assemble the imaging unit 10 by assembling the second urging leaf spring 39, the movable unit 49, the yoke 47 attached with the driving magnet 48, the first urging leaf spring 34, and the first member 12 to the second member 13 in order. Therefore, assembly work for the imaging unit 10 including the lens unit 10a is easy and it is possible to reduce work time.

Figure 29:
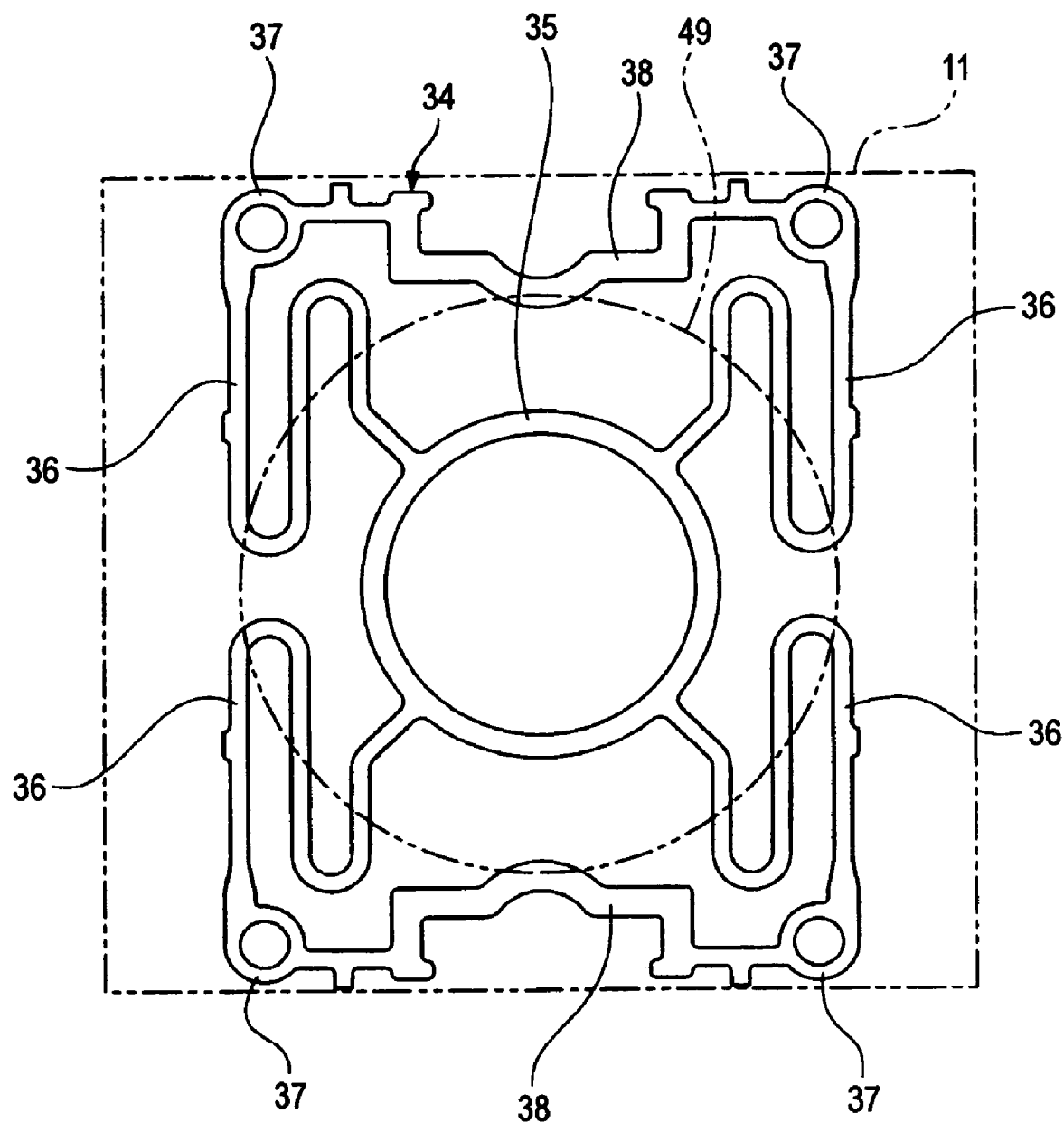
FIG. 29 is a conceptual diagram showing a positional relation of the first urging leaf spring to the lens barrel and the movable unit.
Figure 30:
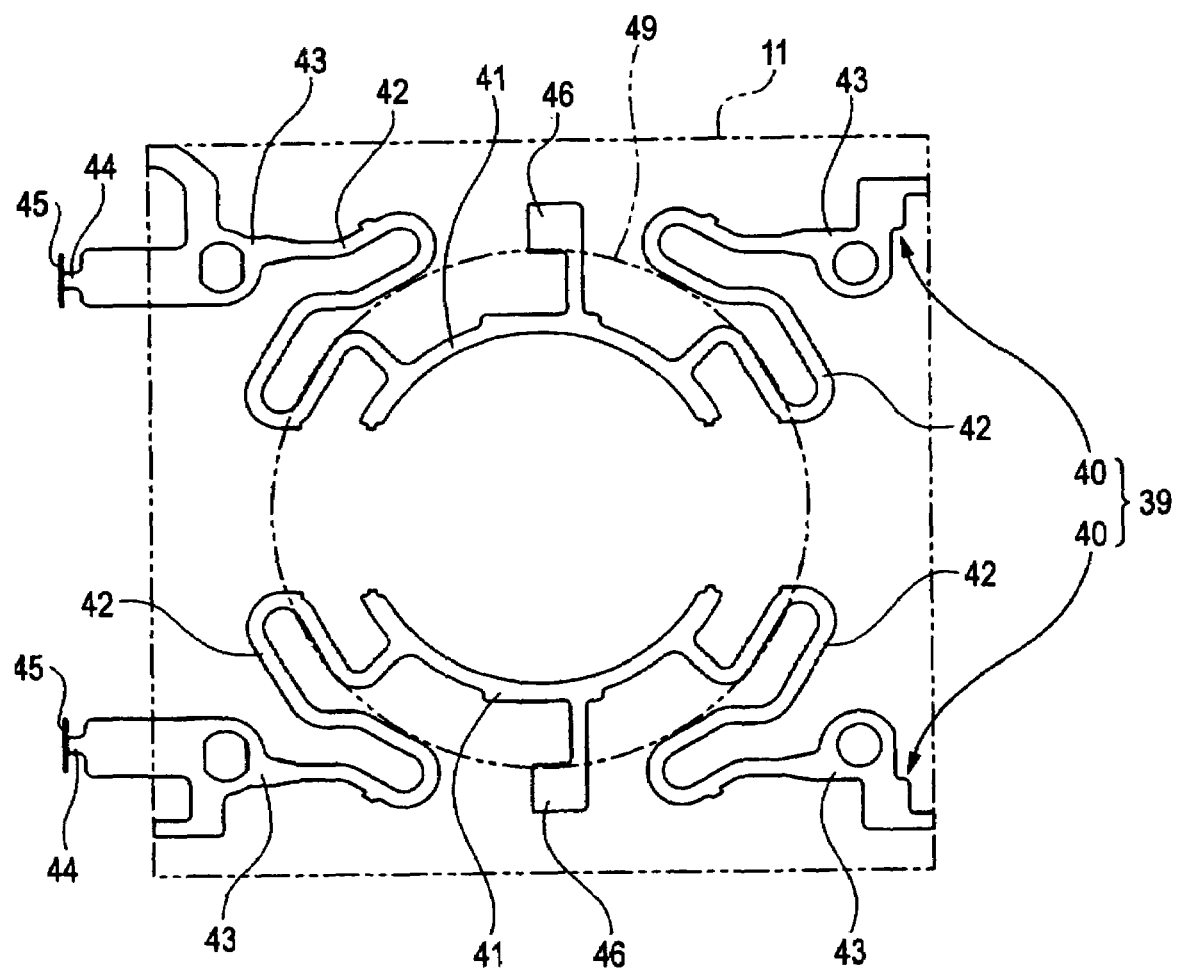
FIG. 30 is a conceptual diagram showing a positional relation of the second urging leaf spring to the lens barrel and the movable unit.

In the imaging unit 10 assembled as described above, as an external shape projected from the optical axis direction, the lens barrel 11 assumes a substantially rectangular shape and the movable unit 49 assumes a substantially circular shape (see FIGS. 29 and 30). In this state, the spring sections 36 of the first urging leaf spring 34 and the spring sections 42 of the second urging leaf spring 39 are located at four corners in the lens barrel 11.

Therefore, an arrangement space for the spring sections 36 and 42 only has to be a minimum space. Thus, it is possible to realize reduction in a size of the imaging unit 10 including the lens unit 10a.

Figure 31:
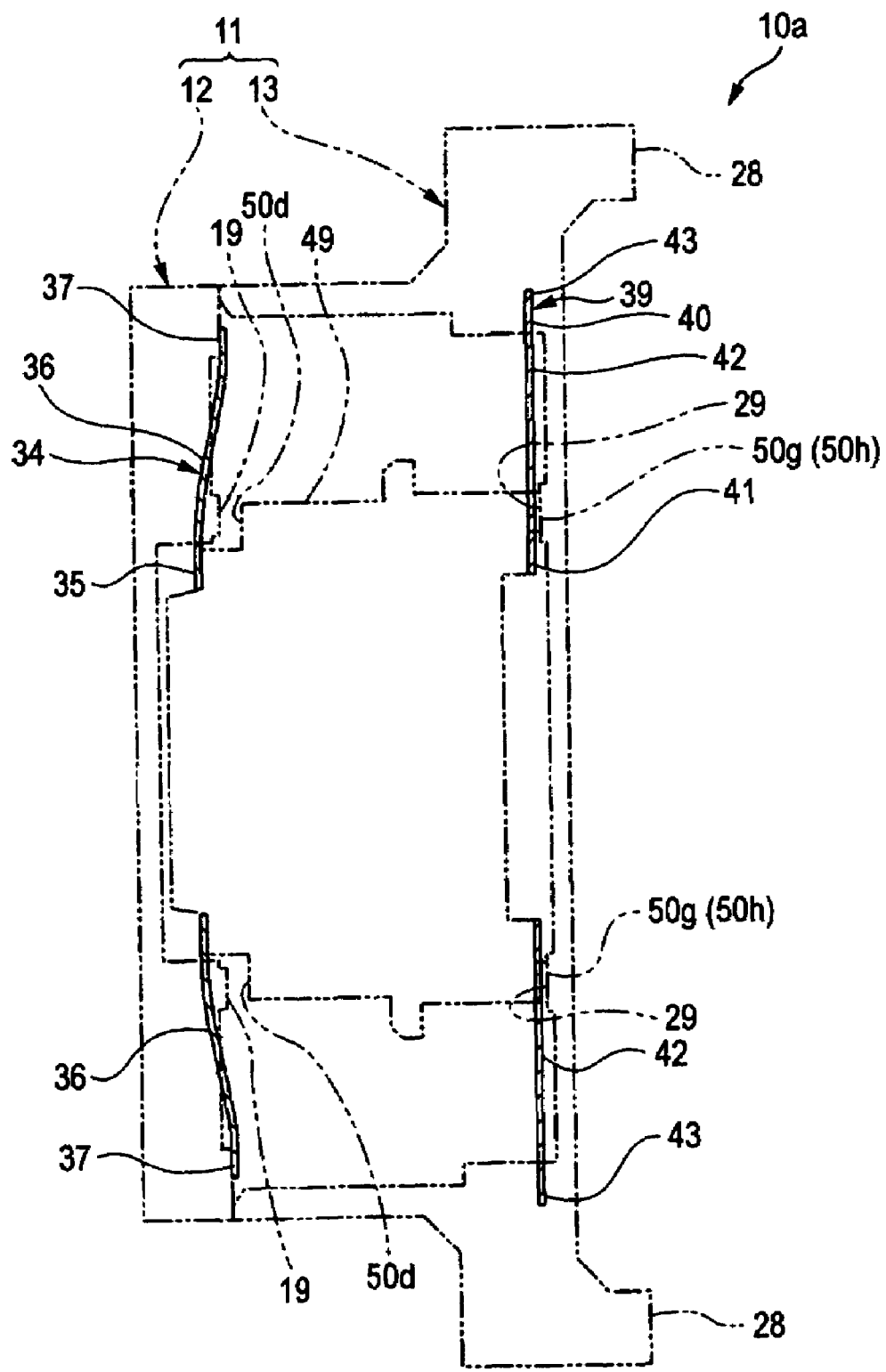
FIG. 31 is a schematic enlarged sectional view of the imaging unit in a state in which the movable unit is held at infinity.

In the imaging unit 10 assembled as described above, a spring force of the first urging leaf spring 34 is set larger than a spring force of the second urging leaf spring 39. Therefore, at the time of non-driving of the linear actuator 68 when an electric current is not applied to the driving coil 51, as shown in FIG. 31, the movable unit 49 is urged to the imaging section 63 side (the rear side) in the optical axis direction by an urging force of the first urging leaf spring 34. The lens holder 50 is brought into contact with the regulating surface sections 29 of the second member 13 to be kept at infinity in focus driving.

In general, a user of the imaging device 1 more often uses the imaging device 1 in a state in which the movable unit 49 is at infinity than in a state in which the movable unit 49 is at the macro end. Therefore, as described above, at the time of non-driving of the linear actuator 68, the movable unit 49 is typically held in the state of infinity by an urging force of the first urging leaf spring 34. Consequently, power consumption is unnecessary in a state in which frequency of use is high. It is possible to minimize power consumption.

When it is assumed that frequency of use at the macro end is higher than frequency of use at infinity, it is also possible that a spring force of the second urging leaf spring 39 is set larger than a spring force of the first urging leaf spring 34 and, at the time of non-driving of the linear actuator 68, the movable unit 49 is typically held at the macro end by an urging force of the second urging leaf spring 39 to make power consumption unnecessary in a state in which frequency of use is high.

Figure 2:
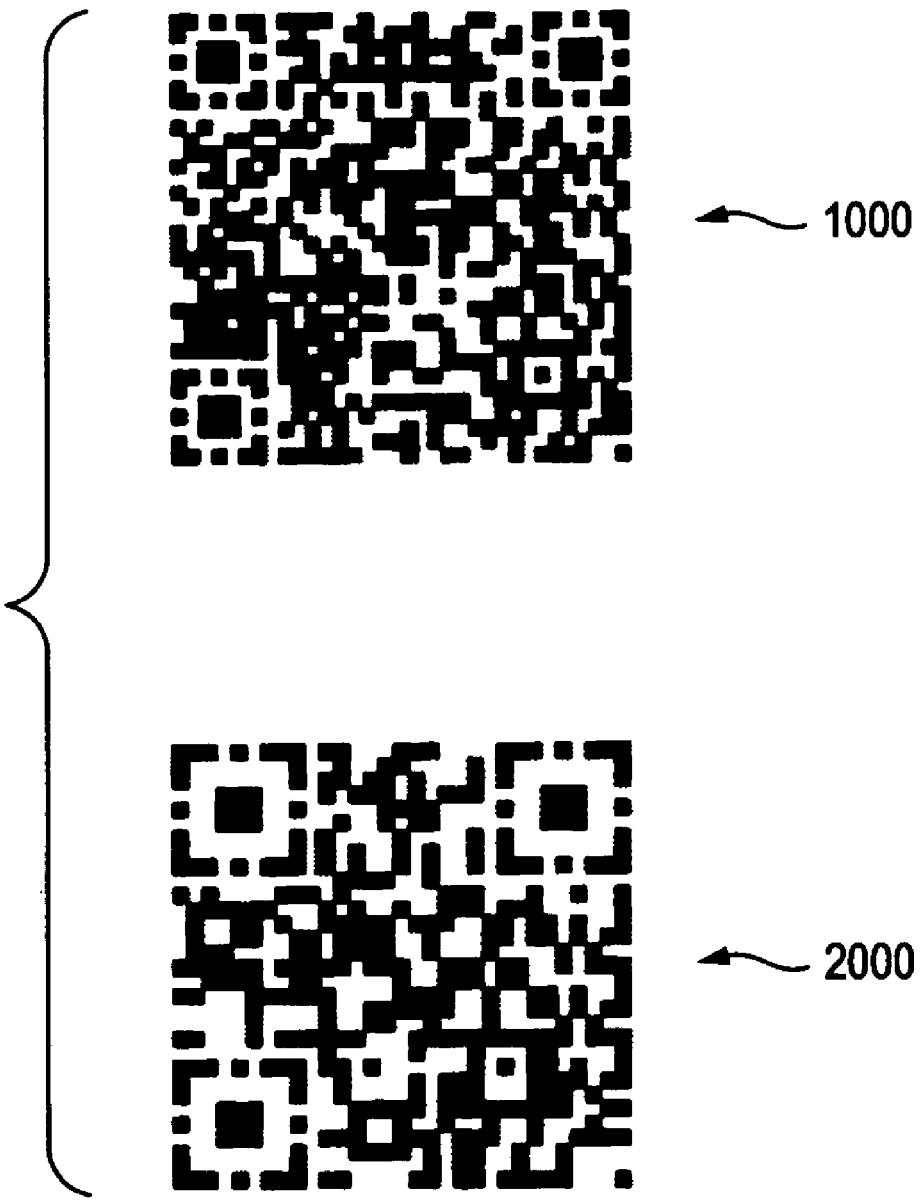
FIG. 2 is an enlarge plan view showing examples of a two-dimensional barcode.

Examples of use at the macro end of the imaging device 1 include reading of information of various kinds of display for the purpose of identification such as a one-dimensional barcode and the two-dimensional barcodes 1000 and 2000 shown in FIG. 2.

When the imaging device 1 is used as a portable device, a difference of posture can occur in the movable unit 49 depending on a direction of use of the imaging device 1. However, as described above, in the state of infinity with high frequency of use, the movable unit 49 is pressed against the second member 13 and held by an urging force of the first urging leaf spring 34. Thus, a difference of posture of the movable unit 49 less easily occurs and it is possible to realize improvement of a quality of an image.

In a state in which the movable unit 49 is at infinity, in the first urging leaf spring 34, the holding section 35 is located on a front side with respect to the attachment sections 37 and, in the second urging leaf spring 39, all of the holding sections 41, the spring sections 42, and the attachment sections 43 are located on an identical plane.

Therefore, in the second urging leaf spring 39, all of the holding sections 41, the spring sections 42, and the attachment sections 43 are located on an identical plane in the state of infinity. At the time of movement in the optical axis direction of the movable unit 49, the holding sections 41 are typically located in front with respect to the attachment sections 43.

In this way, in the imaging unit 10, in the second urging leaf spring 39, all of the holding sections 41, the spring sections 42, and the attachment sections 43 are located on an identical plane in the state of infinity. At the time of movement of the movable unit 49, the holding sections 41 are typically located in front with respect to the attachment sections 43. Thus, it is possible to arrange the spring sections 42, which are deformed at the time of movement of the movable unit 49, in a position where the spring sections 42 overlap the movable section 49 in the optical axis direction.

Therefore, it is possible to reduce an arrangement space for the second urging leaf spring 39 in the direction orthogonal to the optical axis direction and realize a reduction in size of the imaging unit 10.

In the imaging unit 10, the first linear sections 42b and the second linear sections 42c of the second urging leaf spring 39 are formed to extend in a substantially tangential direction of the holding section 41 and along the holding section 41. Therefore, it is possible to reduce an arrangement space for the second urging leaf spring 39 and realize a reduction in size of the imaging unit 10.

At the time of driving of the linear actuator 68, an electric current is applied to the driving coil 51. The electric current application is performed via the control circuit board 65 of the imaging section 63 and the second urging leaf spring 39. Therefore, the second urging leaf spring 39 is also used as electric current applying means in addition to a role of urging the movable unit 49. Thus, in the lens unit 10a, special-purpose means is not specifically necessary in order to apply an electric current to the driving coil 51 and it is possible to realize a reduction in the number of components.

In the imaging unit 10, it is also possible to, without dividing the second urging leaf spring 39 into the two spring members 40, connect the first urging leaf spring 34 to one end of the driving coil 51 and connect the second urging leaf spring 39 to the other end of the driving coil 51 to secure a path for electric current application to the driving coil 51.

However, when the path for electric current application is secured using the first urging leaf spring 34 and the second urging leaf spring 39 in this way, in the imaging unit 10, the driving magnet 48 and the yoke 47 cover the driving coil 51 from the first urging leaf spring 34 side. Thus, it is likely that wiring work and work for connecting the driving coil 51 to the first urging leaf spring 34 and the second urging leaf spring 39 are difficult.

Therefore, as described above, the second urging leaf spring 39 is divided into the two spring members 40 to secure a path for electric current application to the driving coil 51. This makes it possible to realize improvement of workability in the wiring work and the connection work.

Figure 32:
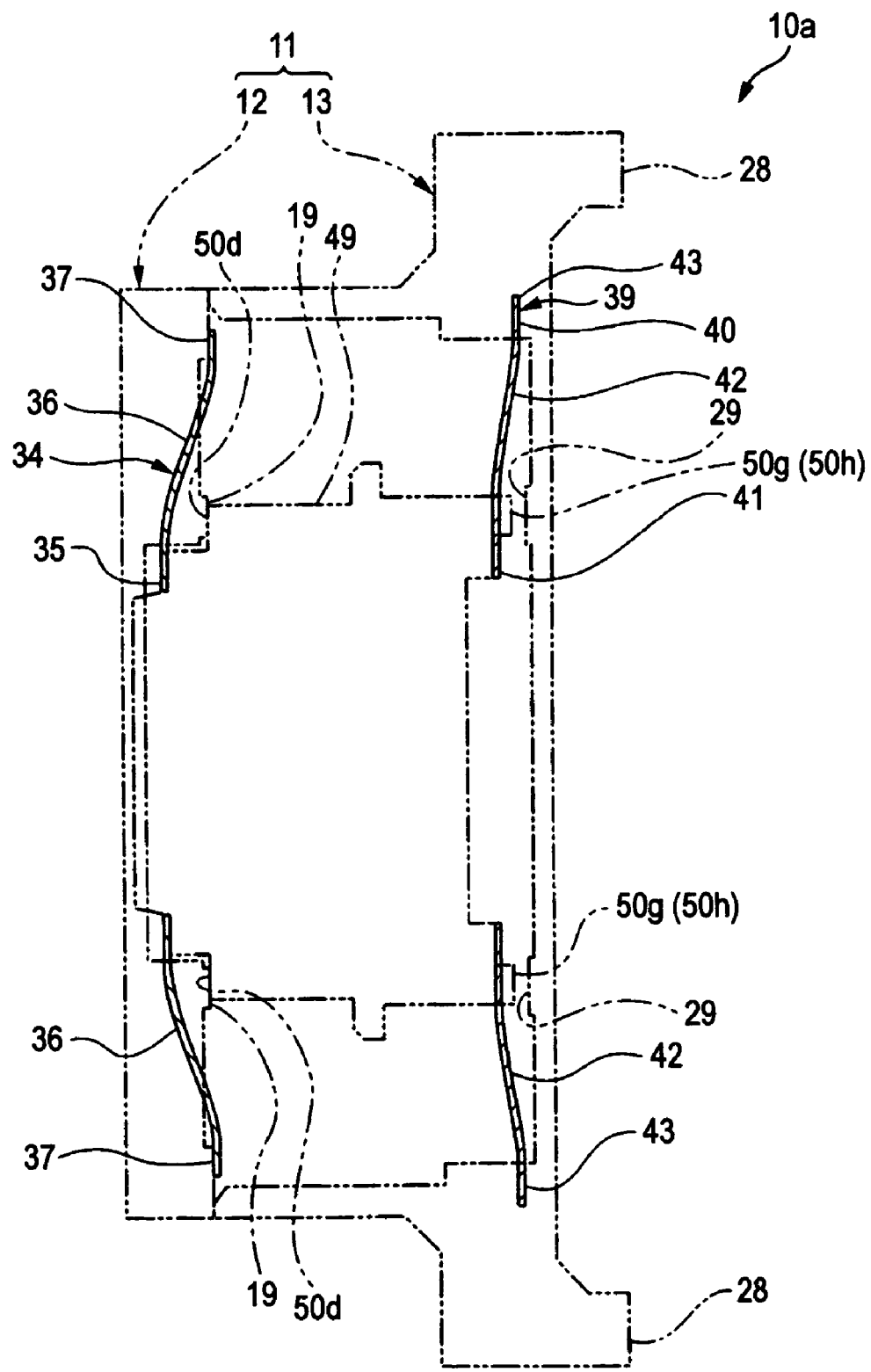
FIG. 32 is a schematic enlarged sectional view of the imaging unit in a state in which the movable unit is held at a macro end.

When an electric current is applied in one predetermined direction to the driving coil 51, the movable unit 49 is moved to a subject side (forward) in the optical axis direction to a position corresponding to a magnitude of a voltage by driving of the linear actuator 68 (see FIG. 32). The movable unit 49 is made movable to the macro end where the regulated surface sections 50d of the lens holder 50 come into contact with the regulating surface sections 19 of the first member 12.

When the electric current application to the driving coil 51 is stopped, the movable unit 49 is moved backward by an urging force of the first urging leaf spring 34. The movable unit 49 is made movable to the state of infinity (see FIG. 31).

Figure 33:
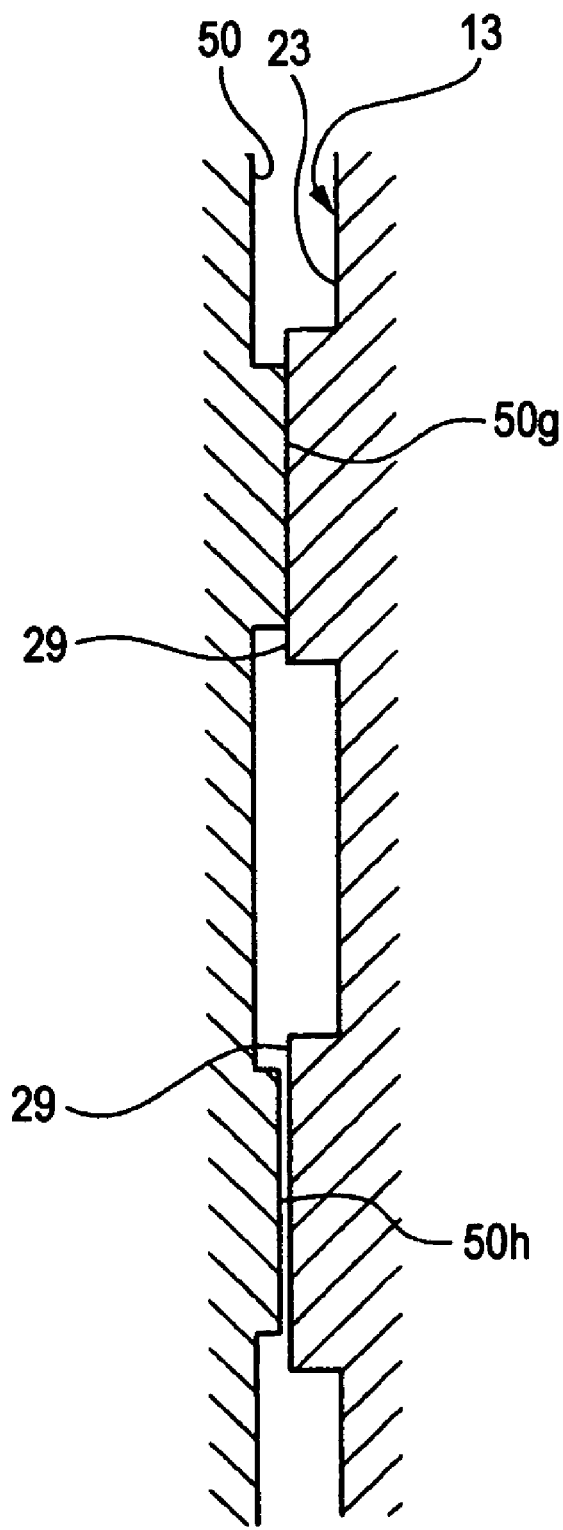
FIG. 33 is a conceptual diagram showing a state in which a first regulated surface section of the lens holder and a regulating surface section of the second member are in contact with each other.
Figure 34:
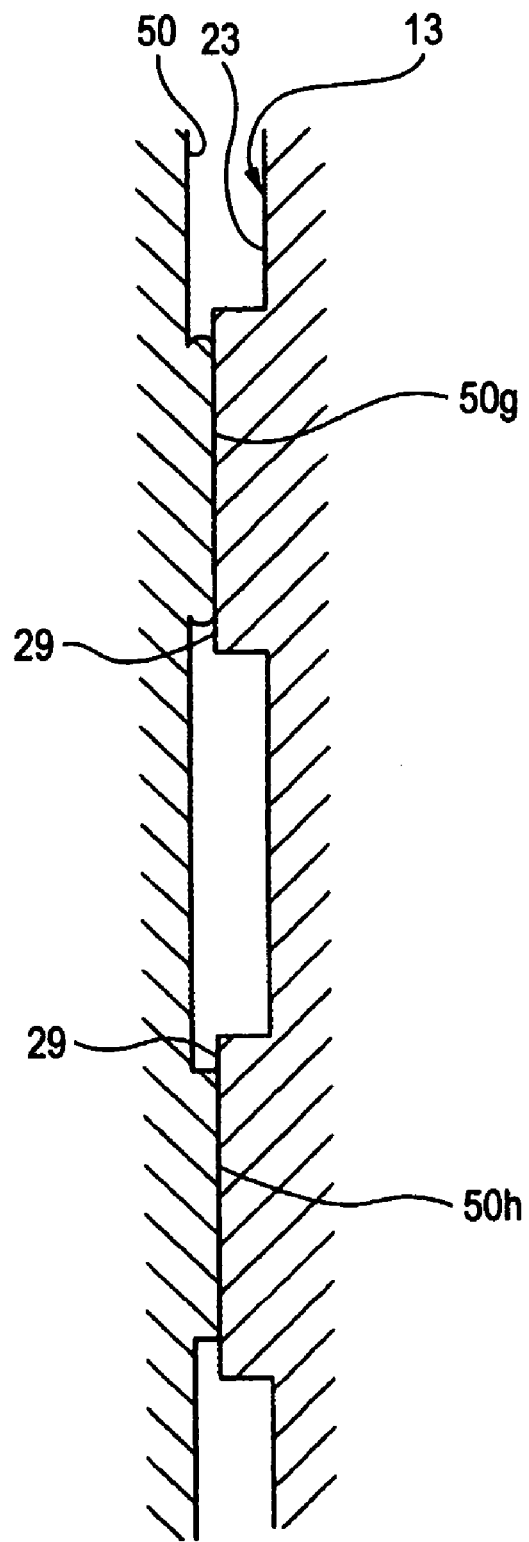
FIG. 34 is a conceptual diagram showing a state in which the first regulated surface section and a second regulated surface section of the lens holder and the regulating surface section of the second member are in contact with each other.

When the movable unit 49 is moved to the state of infinity, the first regulated surface sections 50g formed in the lens holder 50 are brought into contact with the regulating surface sections 29 formed in the second member 13, respectively (see FIG. 33). In this case, when a backward large load is applied to the movable unit 49, after the first regulated surface sections 50g are slightly crushed, the second regulated surface sections 50h in a position slightly on a front side of the first regulated surface sections 50g are also brought into contact with the regulating surface sections 29 (see FIG. 34).

Therefore, even when a large load is applied to the movable unit 49, since the large load is not applied only to the first regulated surface section 50g, it is possible to prevent breakage, wear, and the like of the lens holder 50 and the second member 13.

In the imaging unit 10, the regulating surface sections 19 of the first member 12, the regulating surface sections 29 of the second member 13, and the regulated surface sections 50d and 50g of the lens holder 50 are formed at equal intervals in the peripheral direction, respectively. Thus, it is possible to efficiently absorb an impact caused by contact of the lens holder 50 with the first member 12 or the second member 13 at the time when the movable unit 49 reaches a movement end and realize stabilization of a posture of the movable unit 49.

Moreover, all the regulated surface sections 50d, 50g, and 50h are formed in the lens holder 50 that holds the lens block 53. Thus, it is possible to realize improvement of positional accuracy in the optical axis direction of the lens block 53 and stabilization of a posture of the lens block 53.

Figure 35:
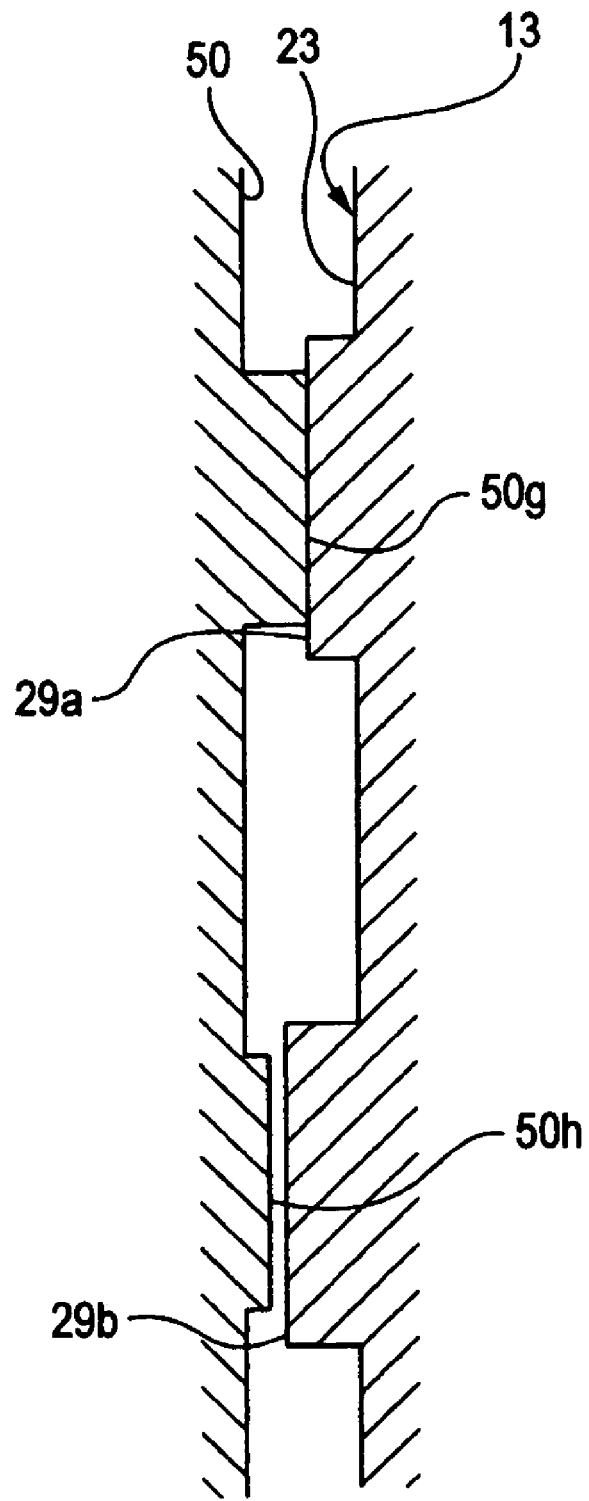
FIG. 35 is a conceptual diagram showing a state in which the first regulated surface section of the lens holder and the regulating surface section of the second member are in contact with each other in another example.

In the example described above, the regulating surface sections 29 located on an identical plane in a surface orthogonal to the optical axis and the first regulated surface sections 50g and the second regulated surface sections 50h, positions in the optical axis direction of which are different, are brought into contact with each other. However, a combination of regulating surface sections and regulated surface sections is not limited to such an example. For example, as shown in FIG. 35, it is also possible that the regulating surface sections 29 are constituted by the first regulating surface sections 29a and the second regulating surface sections 29b, positions in the optical axis direction of which are different, and the regulated surface sections are constituted by the first regulated surface sections 50g and the second regulated surface sections 50h, positions in the optical axis direction of which are different. It is also possible that the regulating surface sections 29 are constituted by the first regulating surface sections 29a and the second regulating surface sections 29b, positions in the optical axis direction of which are different, and the regulated surface sections are constituted by two regulated surface sections located on an identical plane in a surface orthogonal to the optical axis.

In the example described above, the two regulated surface sections 50g and 50h are formed to vary a contact position of the lens holder 50 with the lens barrel 11 in the state of infinity. The contact position of the lens holder 50 with the lens barrel 11 is varied not only in the state of infinity. It is also possible to vary the contact position in the state of the macro end. In this case, the regulated surface sections on the front end side of the lens holder 50 and the regulating surface sections of the first member 12 only have to be constituted by two sections, positions in the optical axis direction of which are different.

As described above, in the imaging device 1, the movable unit 49 is moved to the subject side (forward) in the optical axis direction by applying an electric current to the driving coil 51 and the movable unit 49 is moved to the imaging section 63 side (backward) in the optical axis direction by stopping the electric current application to the driving coil 51. Thus, only one direction is sufficient as a direction of electric current application to the driving coil 51. It is possible to realize simplification of control and power saving at the time of focus driving.

In the example described above, a spring force of the first urging leaf spring 34 is set larger than a spring force of the second urging leaf spring 39 by forming the first urging leaf spring 34 and the second urging leaf spring 39, which are formed of an identical material, in different thicknesses. However, a method of setting a spring force of the first urging leaf spring 34 larger than a spring force of the second urging leaf spring 39 is not limited to the method of forming the leaf springs, which are formed of an identical material, in different thicknesses. For example, it is possible to use various methods such as a method of forming the leaf springs with different materials and a method of forming the leaf springs with different shapes and widths of spring sections.

A shutter unit 75 will be explained.

The shutter unit 75 is arranged on the front side of the imaging unit 10 (see FIGS. 3 and 4) and includes a base plate 76 and necessary sections arranged on a rear surface of the base plate 76. The base plate 76 is formed in a horizontally-long substantially rectangular shape and has an exposure opening 76a.

Figure 36:
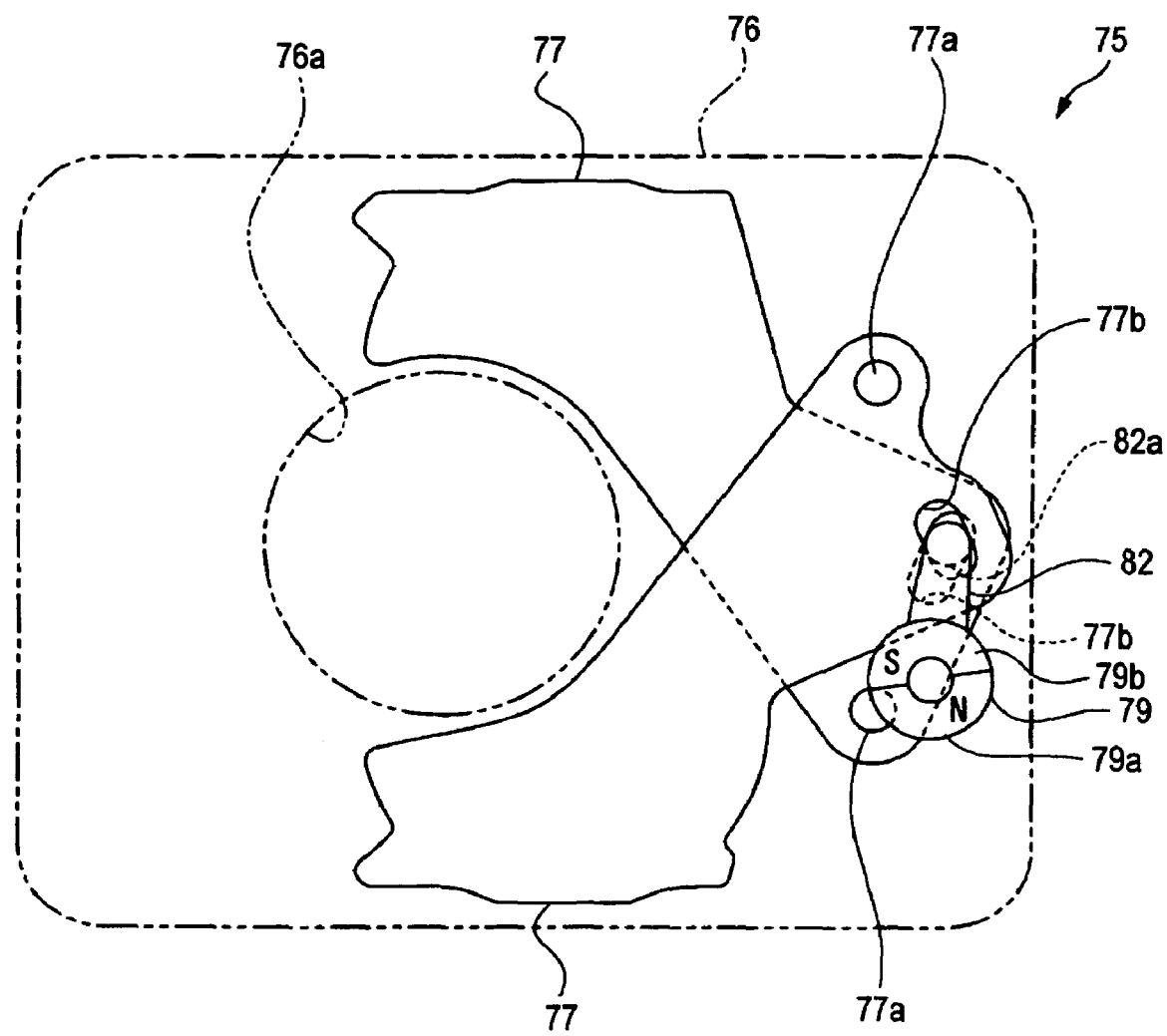
FIG. 36 is an enlarged front view showing a positional relation between an operation magnet and shutter vanes at the time when the shutter vanes are in an open position.
Figure 37:
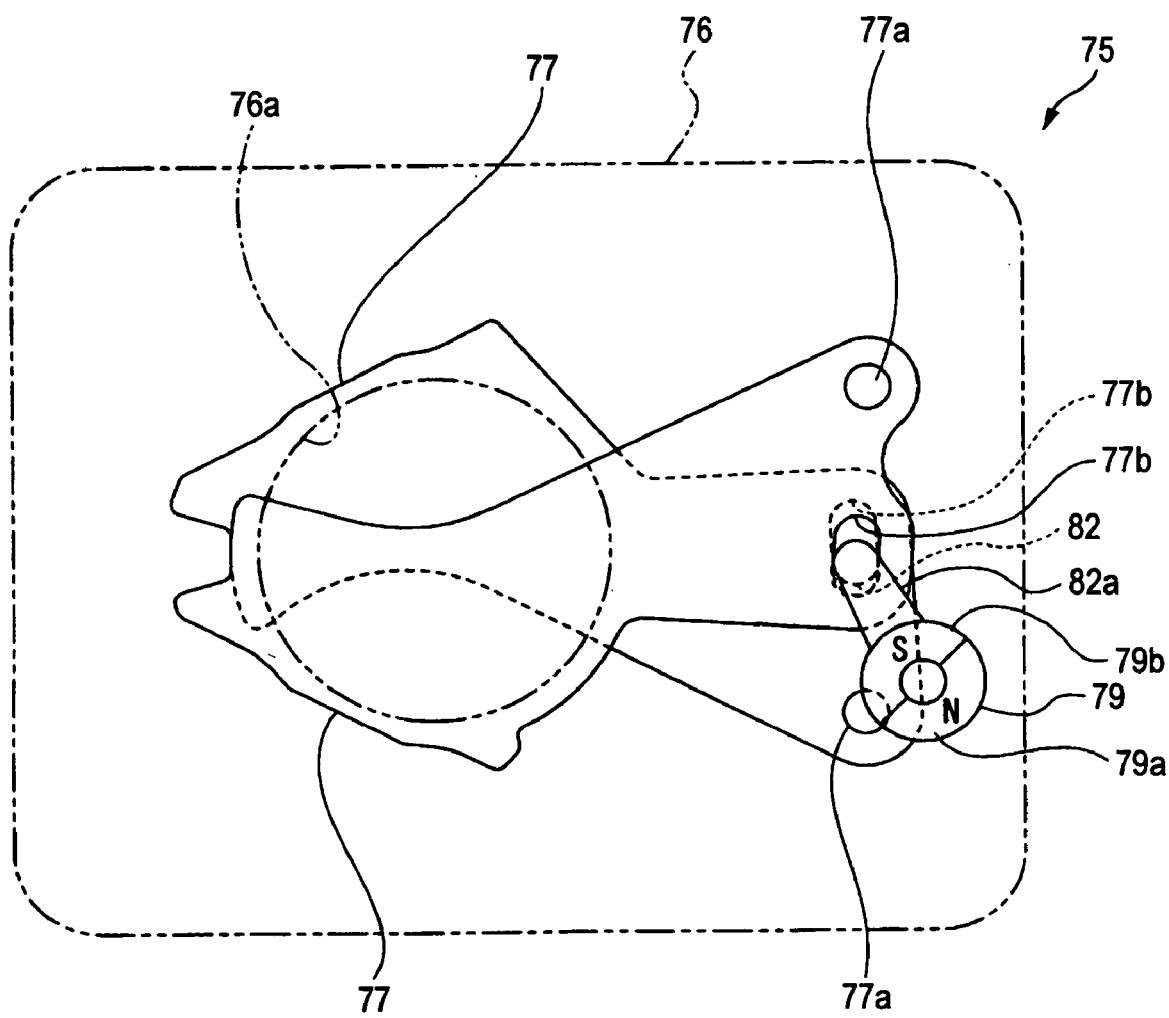
FIG. 37 is an enlarged front view showing a positional relation between the operation magnet and the shutter vanes at the time when the shutter vanes are in a closed position.

On the base plate 76, a pair of shutter vanes 77 are movably supported between an open position for opening the exposure opening 76a (see FIG. 36) and a closed position for closing the exposure opening 76a (see FIG. 37). The shutter vanes 77 are rotatably supported on the base plate 76 with rotational fulcrum sections 77a, which are provided at one ends thereof, as fulcrums, respectively. Engaging long holes 77b are formed in the shutter vanes 77, respectively.

Figure 38:
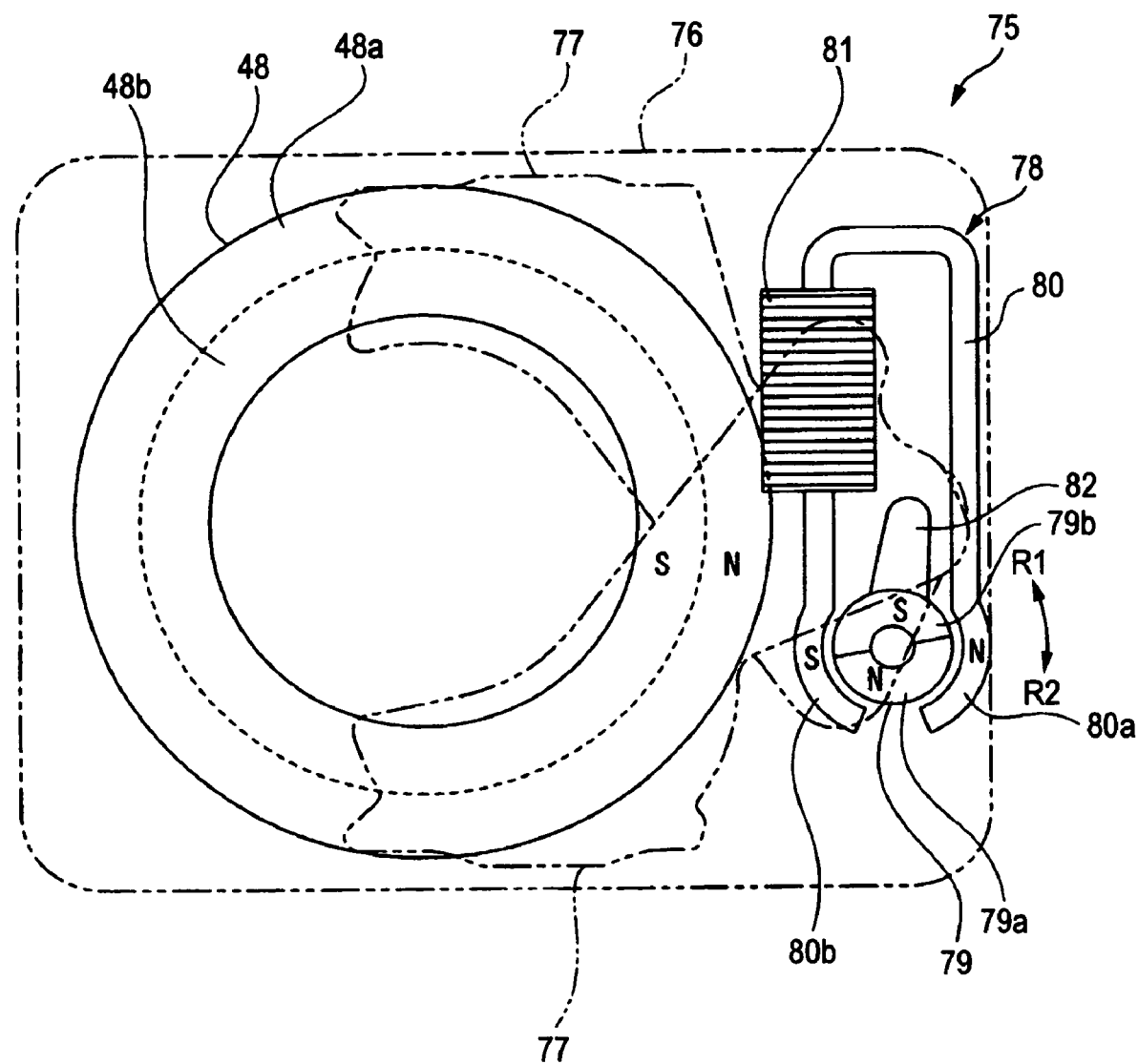
FIG. 38 is an enlarged front view showing, together with a driving magnet, the shutter unit at the time when the shutter vanes are in the open position.
Figure 39:
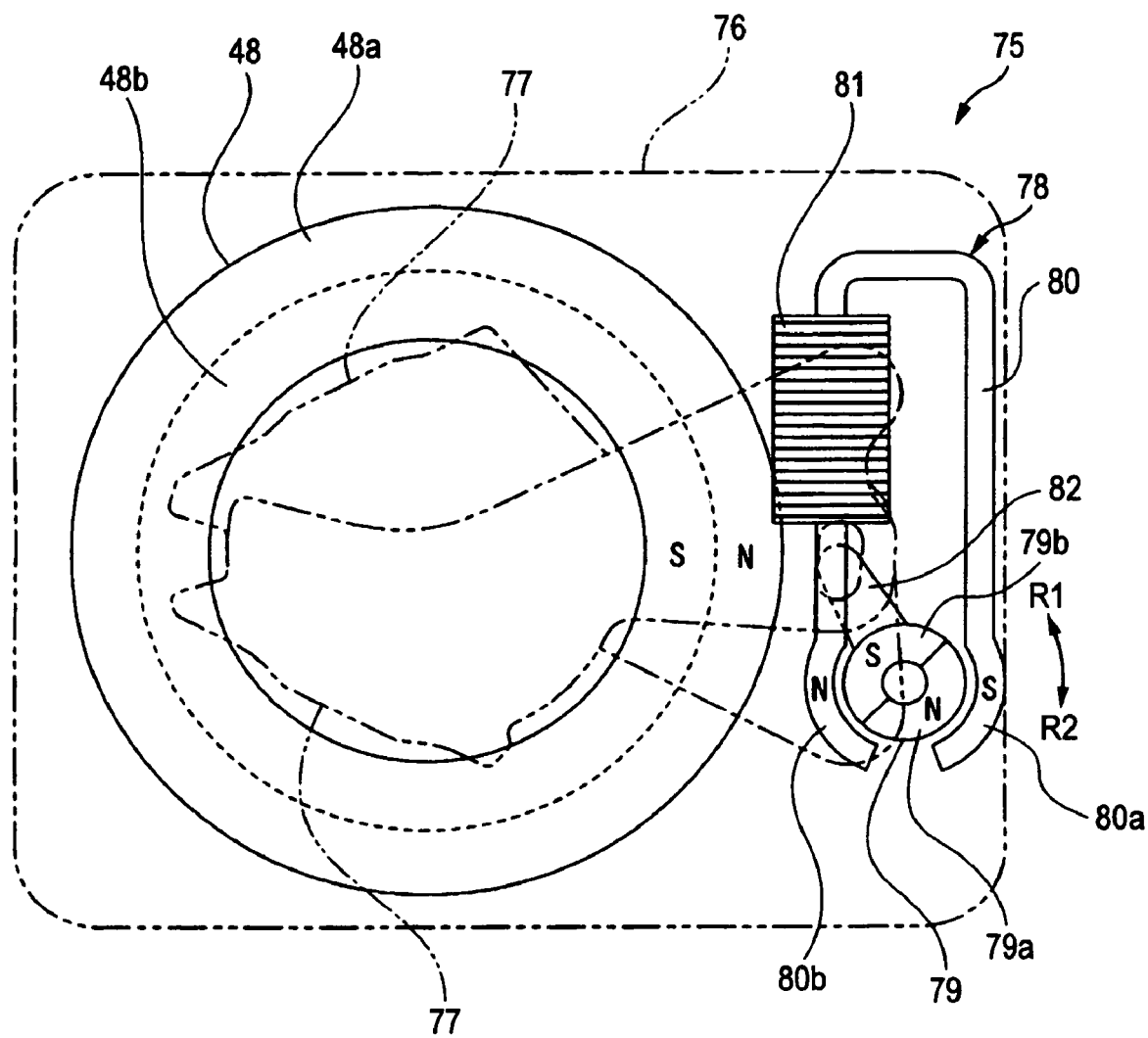
FIG. 39 is an enlarged front view showing, together with the driving magnet, the shutter unit at the time when the shutter vanes are in the closed position.

The shutter vanes 77 are opened and closed by a shutter opening and closing mechanism 78 (see FIGS. 38 and 39). The shutter opening and closing mechanism 78 has an operation magnet 79, a yoke 80, and an operation coil 81.

The operation magnet 79 is formed in a disk shape. One semicircular section and the other semicircular section are polarized as magnetic poles 79a and 79b different from each other. For example, the magnetic pole 79a is polarized as the N pole and the magnetic pole 79b is polarized as the S pole. An arm 78 projected in the radial direction is provided in the operation magnet 79. An engaging projection 78a is provided at a tip of the arm 78.

The operation magnet 79 is made rotatable in a peripheral direction thereof. The arm 78 is rotated integrally with the operation magnet 79. The engaging projection 78a of the arm 78 is slidably engaged with the engaging long holes 77b of the shutter vanes 77. Therefore, when the operation magnet 79 and the arm 78 is integrally rotated in an R1 direction shown in FIGS. 38 and 39, the shutter vanes 77 are rotated toward the closed position with the rotation fulcrum sections 77a as fulcrums. On the other hand, when the operation magnet 79 and the arm 78 are integrally rotated in an R2 direction shown in FIGS. 38 and 39, the shutter vanes 77 are rotated toward the open position with the rotation fulcrum sections 77a as fulcrums.

The yoke 80 is formed in a substantially reverse U shape. Lower ends thereof are provided as actuating sections 80a and 80b formed in an arcuate shape, respectively. The actuating sections 80a and 80b are arranged along the operation magnet 79 on an outer side thereof. The operation coil 81 is arranged in the yoke 80 in an externally fitted shape.

The center of the exposure opening 76a of the base plate 76 is on the optical axis. In a state viewed from the optical axis direction, the driving magnet 48 of the linear actuator 68 and the operation magnet 79 are located on the left and the light of the optical axis.

When an electric current is applied in one direction to the operation coil 81, for example, the actuating section 80a of the yoke 80 is polarized as the S pole and the actuating section 80b of the yoke 80 is polarized as the N pole (see FIG. 39). Therefore, the operation magnet 79 is rotated in the R1 direction in which the magnetic pole 79a is attracted to the actuating section 80a and the magnetic pole 79b is attracted to the actuating section 80b. The shutter vanes 77 are rotated toward the closed position. In this case, since the magnetic pole 48a on an outer peripheral side of the driving magnet 48 is polarized as the N pole, due to an influence of a magnetic force (a fringing field) of the driving magnet 48, propulsion in a direction of attraction to the magnetic pole 48a is applied to the operation magnet 79.

Therefore, in addition to propulsion due to an attraction force of the yoke 80, propulsion in the same direction due to a magnetic force of the driving magnet 48 is applied to the operation magnet 79. Therefore, the shutter vanes 77 are rotated at high speed toward the closed position. It is possible to realize improvement of speed of adjustment of an exposure amount.

The force in the direction of attraction to the magnetic pole 48a of the driving magnet 48 applied to the operation magnet 79 is smaller than an attraction force of the yoke 80 applied to the operation magnet 79 when an electric current is applied to the operation coil 81.

On the other hand, an electric current is applied in the opposite direction to the operation coil 81, for example, the actuating section 80a of the yoke 80 is polarized as the N pole and the actuating section 80b of the yoke 80 is polarized as the S pole (see FIG. 38). Therefore, the operation magnet 79 is rotated in the R2 direction in which the magnetic pole 79a is attracted to the actuating section 80b and the magnetic pole 79b is attracted to the actuating section 80a. The shutter vanes 77 are rotated toward the open position.

In the example described above, speed of movement to the closed position of the shutter vanes 77 is increased. However, conversely, it is also possible to increase speed of movement to the open position of the shutter vanes 77 when necessary by appropriately changing polarization patterns of the driving magnet 48 and the operation magnet 79, a direction of electric current application to the driving coil 81, and the like.

In the example described above, the shutter unit 75 is arranged in front of the lens unit 10a. However, a position of the shutter unit 75 is not limited to the front of the lens unit 10a. For example, the shutter unit 75 may be arranged between the lens unit 10a and the imaging section 63.

In the example described above, the two shutter vanes 77 are provided in the shutter unit 75. However, the number of shutter vanes is not limited to two. The exposure opening 76a may be opened and closed by one shutter vane. The exposure opening 76a may be opened and closed by plural shutter vanes such as three or four shutter vanes. The number of shutter vanes is arbitrary.

In the example described above, the operation magnet 79 is formed in a disk shape. However, a shape of an operation magnet is not limited to the disk shape. The operation magnet may be formed in other shapes such as a cylindrical shape.

As described above in the imaging device 1, propulsion due to a magnetic force of the driving magnet 48, which is a component of the linear actuator 68 for moving the movable unit 49, is applied to the operation magnet 79. Thus, it is possible to realize improvement of operation speed of the shutter vanes 77 without causing a steep rise in cost.

The magnetic force of the driving magnet 48 acts as propulsion of the operation magnet 79 at the time when the shutter vanes 77 are moved toward the closed position. Thus, it is possible to reduce an exposure time and realize improvement of a quality of an image photographed by the imaging device 1.

Moreover, in order to improve operation speed of the operation magnet 79, the driving magnet 48 is formed in an annular shape to polarize the magnetic poles 48a and 48b as magnetic poles different from each other, the operation magnet 79 is formed in a disk shape to polarize the semicircular sections thereof as the magnetic poles 79a and 79b different from each other, and the operation magnet 79 is rotated in a direction corresponding to a direction of electric current application to the operation coil 81. Thus, a structure of the shutter unit 75 is simple and it is possible to realize simplification of a mechanism of the imaging device 1.

In the example described above, the lens unit 10a is applied to the imaging device that performs focus driving. However, it is also possible to apply the lens unit 10a to an imaging device that performs zoom driving.

As shown in FIG. 40, it is also possible to use the lens unit 10a in an imaging device 1A that performs focus driving and zoom driving. An example of such an imaging device 1A will be explained below.

The imaging device 1A includes lens units 10a arranged in the inside of an outer side lens barrel 79. The lens unit 10a arranged on a front side is a lens unit for zoom and the lens unit 10a arranged on a rear side is a lens unit for focus. The imaging section 63 is arranged at a rear end of the outer side lens barrel 79.

A first lens 80 serving as a first group lens is attached to a front end of the outer side lens barrel 79. A second lens 81 serving as a third group lens is attached in the inside of the outer side lens barrel 79. The second lens 81 is arranged between the lens units 10a. Therefore, respective movable lenses of the movable unit 49 of the lens unit 10a on the front side function as a second group lens and respective movable lenses of the movable unit 49 of the lens unit 10a on the rear side function as a fourth group lens.

In the imaging device 1A constituted as described above, the movable unit 49 is moved, in a state in which movable unit 49 is held by the first urging leaf spring 34 and the second urging leaf spring 39, in the optical axis direction by driving of the linear actuator 68 of the lens unit 10a on the front side and zooming is performed. The movable unit 49 is moved, in the state in which movable unit 49 is held by the first urging leaf spring 34 and the second urging leaf spring 39, in the optical axis direction by driving of the linear actuator 68 of the lens unit 10a on the rear side and focusing is performed.

The vertical and horizontal directions described above are only for convenience of explanations. Directions are not limited to these directions.

All the specific shapes and structures of the respective sections described in the embodiment are only examples of in carrying out the invention. The technical scope of the invention should not be restrictively interpreted according to these examples.

A lens unit according to an embodiment of the invention includes a lens barrel having an imaging optical system arranged therein and a movable unit that has a movable lens and is moved in an optical axis direction with respect to the lens barrel. The lens barrel is constituted by coupling a first member and a second member. Fixing pieces located to be spaced apart from each other in a coupling direction of the first member and the second member in a state in which the lens barrel is constituted are provided in the first member and the second member, respectively. Fixing means is filled between the fixing pieces in a state in which the first member and the second member are coupled. The respective fixing pieces are provided in positions where a force is applied in a direction in which the fixing means is compressed by the respective fixing pieces when a force is applied to the first member and the second member in a direction in which the coupling of the first member and the second member is released in a state in which the members are coupled.

Therefore, even if, for example, the lens unit is dropped and a strong impact occurs, the fixing means does not easily peel away from the fixing pieces and the coupling state of the first member and the second member is stabilized. Thus, it is possible to realize improvement of resistance against vibration and resistance against drop impact.

According to another embodiment of the invention, opposed surfaces opposed to each other are formed at side edges where the respective fixing pieces are located to be closest to each other in the state in which the first member and the second member are coupled to constitute the lens barrel. Thus, a direction of a force applied to the first member and the second member when the members are about to be separated and a direction of a compression force applied to the fixing means from the fixing pieces are set to coincide with each other. It is possible to realize improvement of fixing strength between the first member and the second member.

According to still another embodiment of the invention, since an adhesive is used as the fixing means, a space between the fixing pieces is sealed. Thus, it is possible to prevent dust from entering the lens barrel and realize simplification of fixing work.

According to still another embodiment of the invention, an ultraviolet curing adhesive is used as the adhesive. Thus, a contraction factor after hardening is small and it is possible to surely fix the first member and the second member.

An imaging device according to an embodiment of the invention is an imaging device including a lens unit having an imaging optical system arranged in a lens barrel and an imaging element. The lens unit includes the lens barrel in which the imaging optical system is arranged and a movable unit that has a movable lens and is moved in an optical axis direction with respect to the lens barrel. The lens barrel is constituted by coupling a first member and a second member. Fixing pieces located to be spaced apart from each other in a coupling direction of the first member and the second member in a state in which the lens barrel is constituted are provided in the first member and the second member, respectively. Fixing means is filled between the fixing pieces in a state in which the first member and the second member are coupled. The respective fixing pieces are provided in positions where a force is applied in a direction in which the fixing means is compressed by the respective fixing pieces when a force is applied to the first member and the second member in a direction in which the coupling of the first member and the second member is released in a state in which the members are coupled.

Therefore, even if, for example, the imaging device is dropped and a strong impact occurs, the fixing means does not easily peel away from the fixing pieces and the coupling state of the first member and the second member is stabilized. Thus, it is possible to realize improvement of resistance against vibration and resistance against drop impact.

It should be understood by those skilled in the art that various modifications, combinations, sub-combinations, and alterations may occur depending on design requirements and other factors insofar as they are within the scope of the appended claims or the equivalents thereof.

The invention claimed is:

1. A lens unit, comprising:
    a lens barrel having an imaging optical system arranged therein, the lens barrel including a first member and a second member adapted to be coupled together in a coupling direction;
    fixing pieces provided on the first member and the second member, the fixing pieces being spaced apart from one another in the coupling direction when the first member and the second member are coupled together;
    fixing means filled between the fixing pieces when the first member and the second member are coupled together; and
    a movable unit having a movable lens, the movable unit being movable in an optical axis direction with respect to the lens barrel;
    wherein the respective fixing pieces are provided in positions at which a force is applied in a direction in which the fixing means is compressed by the respective fixing pieces when a force is applied to the first member and the second member in a direction in which the first member is released from the second member.

2. A lens unit according to claim 1, wherein surfaces opposed to each other are formed at side edges located closest to each other of the respective fixing pieces when the first member and the second member are coupled together.

3. A lens unit according to claim 1, wherein the fixing means includes an adhesive.

4. A lens unit according to claim 3, wherein the adhesive is an ultraviolet curing adhesive.

5. An imaging device, comprising:
    a lens unit; and
    an imaging element;
    the lens unit including:
        a lens barrel having an imaging optical system arranged therein, the lens barrel including a first member and a second member adapted to be coupled together in a coupling direction;
        fixing pieces provided on the first member and the second member, the fixing pieces being spaced apart from one another in the coupling direction when the first member and the second member are coupled together;
        fixing means filled between the fixing pieces when the first member and the second member are coupled together; and
        a movable unit having a movable lens, the movable unit being movable in an optical axis direction with respect to the lens barrel;
        the respective fixing pieces being provided in positions at which a force is applied in a direction in which the fixing means is compressed by the respective fixing pieces when a force is applied to the first member and the second member in a direction in which the first member is released from the second member.

* * * * *